US012145282B2

(12) United States Patent
Karchon et al.

(10) Patent No.: US 12,145,282 B2
(45) Date of Patent: Nov. 19, 2024

(54) KNIFE ASSEMBLY HAVING A SPACER OR SWITCH BUTTON INCLUDING TRITIUM

(71) Applicant: Cammenga Company, LLC, Dearborn, MI (US)

(72) Inventors: Christopher J. Karchon, Birmingham, MI (US); Alexander J. Karchon, Birmingham, MI (US)

(73) Assignee: SHERPA ENTERPRISES, LLC, Dearborn, MI (US)

( * ) Notice: Subject to any disclaimer, the term of this patent is extended or adjusted under 35 U.S.C. 154(b) by 346 days.

(21) Appl. No.: 17/832,836

(22) Filed: Jun. 6, 2022

(65) Prior Publication Data

US 2022/0305683 A1 Sep. 29, 2022

Related U.S. Application Data

(63) Continuation-in-part of application No. 16/437,012, filed on Jun. 11, 2019, now Pat. No. 11,407,130, which is a continuation of application No. 15/443,263, filed on Feb. 27, 2017, now Pat. No. 10,357,888.

(60) Provisional application No. 63/307,921, filed on Feb. 8, 2022, provisional application No. 63/196,742, filed on Jun. 4, 2021, provisional application No. 62/300,285, filed on Feb. 26, 2016.

(51) Int. Cl.

| | |
|---|---|
| ***B26B 11/00*** | (2006.01) |
| ***B26B 1/02*** | (2006.01) |
| ***B26B 1/10*** | (2006.01) |
| ***F21K 2/00*** | (2006.01) |

(52) U.S. Cl.

CPC ................ *B26B 11/00* (2013.01); *B26B 1/02* (2013.01); *B26B 1/10* (2013.01); *F21K 2/00* (2013.01)

(58) Field of Classification Search

CPC .. B26B 11/00; B26B 1/02; B26B 1/08; B26B 1/10; F21K 2/00

USPC ......... 362/109, 84, 119, 257, 297, 318, 364, 362/368; 30/313, 153, 155, 162, 164, 30/329, 330, 335

See application file for complete search history.

(56) References Cited

U.S. PATENT DOCUMENTS

| | | | |
|---|---|---|---|
| 4,364,104 | A | 12/1982 | Holahan et al. |
| 5,111,580 | A | 5/1992 | Bosscha et al. |
| 5,402,575 | A | 4/1995 | Maxcy |
| 5,626,414 | A | 5/1997 | Chen |
| 6,027,224 | A | 2/2000 | Schnell |
| 6,257,734 | B1 | 7/2001 | Tchira |
| 7,063,435 | B2 | 6/2006 | Dallas et al. |
| 2006/0049365 | A1 | 3/2006 | Hickey |
| 2009/0193664 | A1 | 8/2009 | Galyean |
| 2010/0314228 | A1 | 12/2010 | Huang |
| 2011/0032724 | A1 | 2/2011 | Kinoshita |
| 2012/0051072 | A1 | 3/2012 | Yelverton et al. |

(Continued)

*Primary Examiner* — Phong H Nguyen

(74) *Attorney, Agent, or Firm* — Dickinson Wright PLLC

(57) ABSTRACT

A knife assembly includes a handle having a first and second handle portion each extending in spaced relationship with one another between a first and second knife end to define a working gap. A knife blade is pivotably secured to the second knife end and pivotable between a closed and engaged position. A switch button is interconnected to the handle for releasing the knife blade from the closed or engaged positions. A spacer is disposed within the working gap and extends between the first and second handle portions. A vial of tritium is housed within the switch button for allowing tritium produced by the tritium vial to be viewable by a user of the knife assembly.

20 Claims, 20 Drawing Sheets

(56) References Cited

U.S. PATENT DOCUMENTS

| | | | |
|---|---|---|---|
| 2013/0312264 | A1 | 11/2013 | Cohen |
| 2014/0198485 | A1 | 7/2014 | Karchon et al. |
| 2015/0070879 | A1 | 3/2015 | Bilinski et al. |
| 2016/0151923 | A1 | 6/2016 | Sisson |

KNIFE ASSEMBLY HAVING A SPACER OR SWITCH BUTTON INCLUDING TRITIUM

CROSS-REFERENCE TO RELATED APPLICATIONS

This application is a continuation-in-part of U.S. application Ser. No. 16/437,012 filed on Jun. 11, 2019, which is a continuation of U.S. application Ser. No. 15/443,263 filed on Feb. 27, 2017, now U.S. Pat. No. 10,357,888, each of which claims the benefit of U.S. Provisional Patent Application Ser. No. 62/300,285 filed Feb. 26, 2016. This continuation-in-part application also claims priority to U.S. Provisional Application Ser. No. 63/196,742 filed on Jun. 4, 2021 and U.S. Provisional Application Ser. No. 63/307,921 filed on Feb. 8, 2022, the entire disclosures of the applications being considered part of the disclosure of this application and hereby incorporated by reference.

BACKGROUND OF THE INVENTION

1. Field of the Disclosure

The present disclosure relates generally to a spacer or switch button for a knife assembly. More specifically, the present disclosure relates to a knife assembly which has a spacer or switch button that includes tritium.

The present disclosure also specifically relates to a knife assembly which has both a spacer and switch button that each include tritium.

2. Description of the Prior Art

This section provides a general summary of background information and the comments and examples provided in this section are not necessarily prior art to the present disclosure.

Tritium is a radioactive isotope of hydrogen which can be used as a luminary device for watches, compasses, knives, guns, tools, and the like. Naturally occurring tritium is extremely rare and thus too small for practical recovery. Accordingly, tritium is typically only produced in nuclear reactors and provided or retained within glass vials. However, the use of tritium in products, such as watches, compasses, knives, guns, tools, and the like, is closely regulated by various U.S. governmental organizations to protect the health and safety of the public and the environment. Toward that end, the use and incorporation of the tritium glass vials into said products is closely regulated by the federal government and any such use must sufficiently establish that the tritium vials are adequately protected from damage or breakage during their regular and everyday use. Absent such proof, the use and incorporation of tritium glass vials into said products is simply not permitted by the various U.S. governmental organizations.

Thus, there remains a significant and continuing need for aspects of incorporating tritium vials into components of knife assemblies, such as a spacer or switch button, which are intended to meet these strict government regulations while correspondingly providing the aesthetic and luminary benefits which stem from the use of tritium in the knife assembly.

SUMMARY OF THE INVENTION

According to an aspect, the subject invention is directed to a knife assembly which includes a handle having a first handle portion and a second handle portion each extending in spaced and parallel relationship with one another from a first knife end to a second knife end to define a working gap disposed between the handle portions. A knife blade is pivotably secured to one of the knife ends and pivotable from an engaged position wherein the knife blade extends from the respective knife end to a closed position wherein the knife blade is at least partially disposed between the first and second handle portions. At least one spacer is disposed within the working gap and extends between the first and second handle portions for spacing the first and second handle portions from one another. At least one tritium vial is housed within the at least spacer for allowing illumination produced by the at least one tritium vial to be viewable within the working gap. The spacer isolates and protects the tritium vial from any impact, chemicals, water, or other environmental conditions of the knife assembly which could otherwise damage or break the tritium vial.

According to another aspect, the subject invention is directed to a knife assembly which includes a handle extending from a first knife end to a second knife end. A knife blade is interconnected to the handle and movable between a closed position wherein at least a portion of the knife blade is housed within the handle to an engaged position wherein the knife blade extends from one of the ends of the handle. A switch button is interconnected to the handle for releasing the knife blade from at least one of the closed or engaged positions. At least one vial of tritium is housed within the switch button to encapsulate and protect the at least one tritium vial from environmental conditions of the knife assembly. The switch button defines at least one opening for allowing illumination produced by the tritium vial to be viewable by a user of the knife assembly.

Accordingly to another aspect, the subject invention is directed to a knife assembly which includes a handle having a first handle portion and a second handle portion extending in spaced and parallel relationship with one another from a first knife end to a second knife end to define a working gap. A knife blade is pivotably secured to one of the knife ends and pivotable from an engaged position wherein the knife blade extends from the respective knife end to a closed position wherein the knife blade is at least partially disposed between the first and second handle portions. A switch button is interconnected to the handle for releasing the knife blade from at least one of the closed or engaged positions. At least one spacer is disposed within the working gap and extends between the first and second handle portions for spacing the first and second handle portions from one another. A first vial of tritium is housed within the switch button and a second vial of tritium is housed within the at least one spacer to protect and isolate the tritium vials from an environment of the knife assembly. The switch button defines at least one opening for allowing tritium produced by the first tritium vial to be viewable by a user of the knife assembly. Additionally, the at least one spacer is comprised of a transparent or translucent material for allowing illumination produced by the second tritium vial to be viewable through the spacer.

BRIEF DESCRIPTION OF THE DRAWINGS

The drawings described herein are for illustrative purposes only of selected embodiments and not all possible implementations, and are not intended to limit the scope of the present disclosure.

DETAILED DESCRIPTION OF THE ENABLING EMBODIMENTS

Example embodiments of a knife assembly which includes a spacer or switch button incorporating tritium in accordance with the present disclosure will now be more fully described. Each of these example embodiments are provided so that this disclosure is thorough and fully conveys the scope of the inventive concepts, features and advantages to those skilled in the art. To this end, numerous specific details are set forth such as examples of specific components, devices and mechanisms associated with the spacers or switch buttons to provide a thorough understanding of each of the embodiments associated with the present disclosure. However, as will be apparent to those skilled in the art, not all specific details described herein need to be employed, the example embodiments may be embodied in many different forms, and thus should not be construed or interpreted to limit the scope of the disclosure. For example, although the subject disclosure is focused on various aspects of incorporating tritium into spacers or switch buttons of a knife assembly, one of skill in the art would readily appreciate that the details described herein can be employed in a wide range of other applications or devices, such as other bladed products, and any other tools, which would benefit from tritium illumination in spacers, switch buttons, or other components, such as the multi-tool illustrated in FIG. 23.

Figure 1:
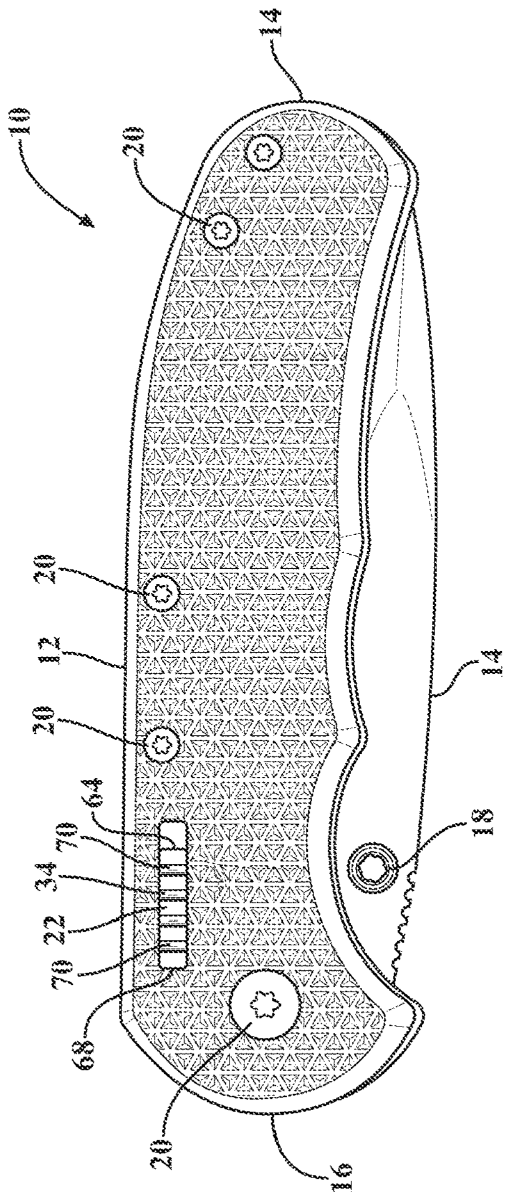
FIG. 1 is a perspective view of a folding knife assembly illustrating a handle extending from a first knife end to a second knife end and a knife blade disposed in a closed position.
Figure 2:
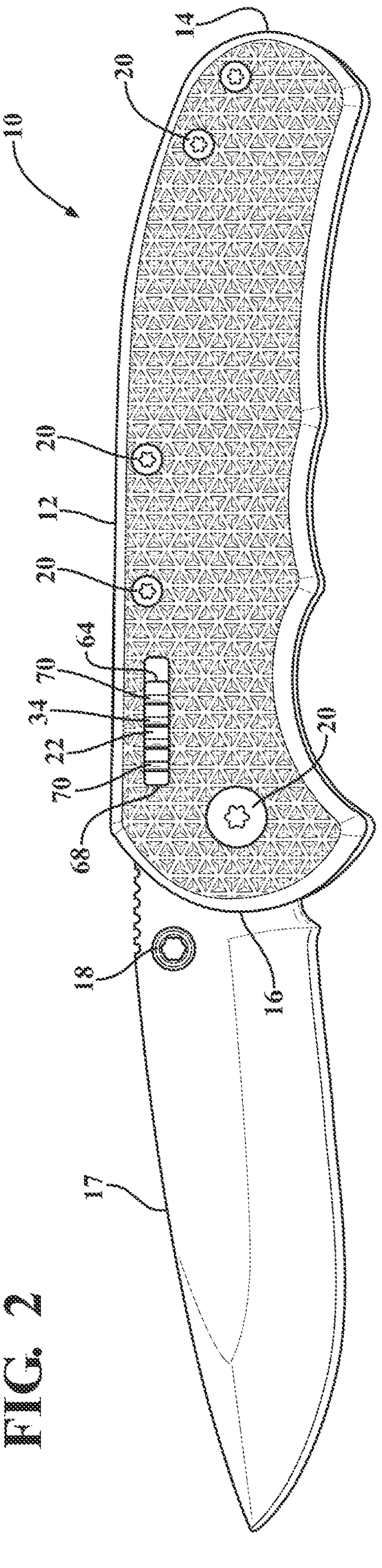
FIG. 2 is a perspective view of the folding knife assembly illustrating the knife blade extending from the second knife end to define an engaged or open position of the knife assembly and a switch button interconnected to the handle for releasing the knife blade from the engaged or open position.
Figure 16:
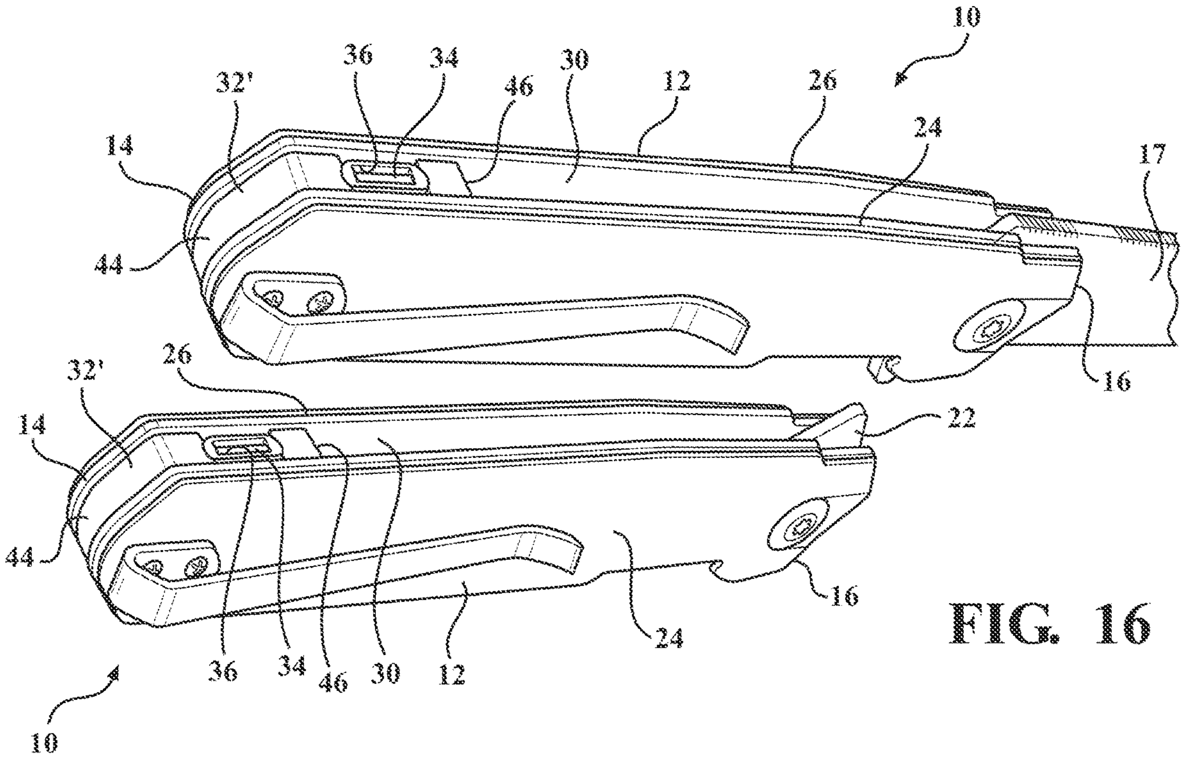
FIG. 16 is a partial perspective view of the second embodiment of the folding knife assembly illustrating the knife in both the closed and open positions.
Figure 20:
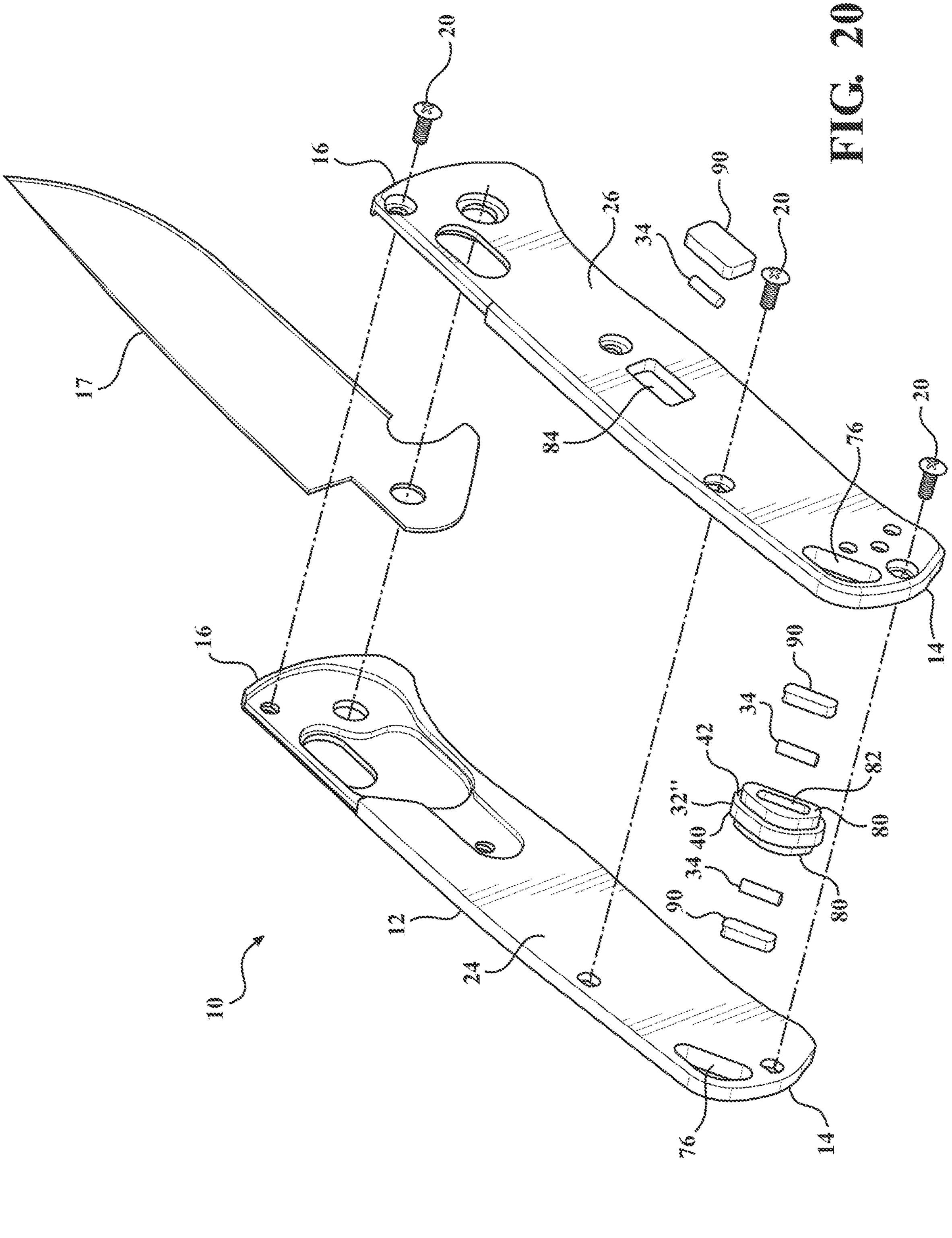
FIG. 20 is an exploded perspective view of another arrangement of the first embodiment of the folding knife assembly illustrating the spacer arranged as a lanyard hole plug.
Figure 21:
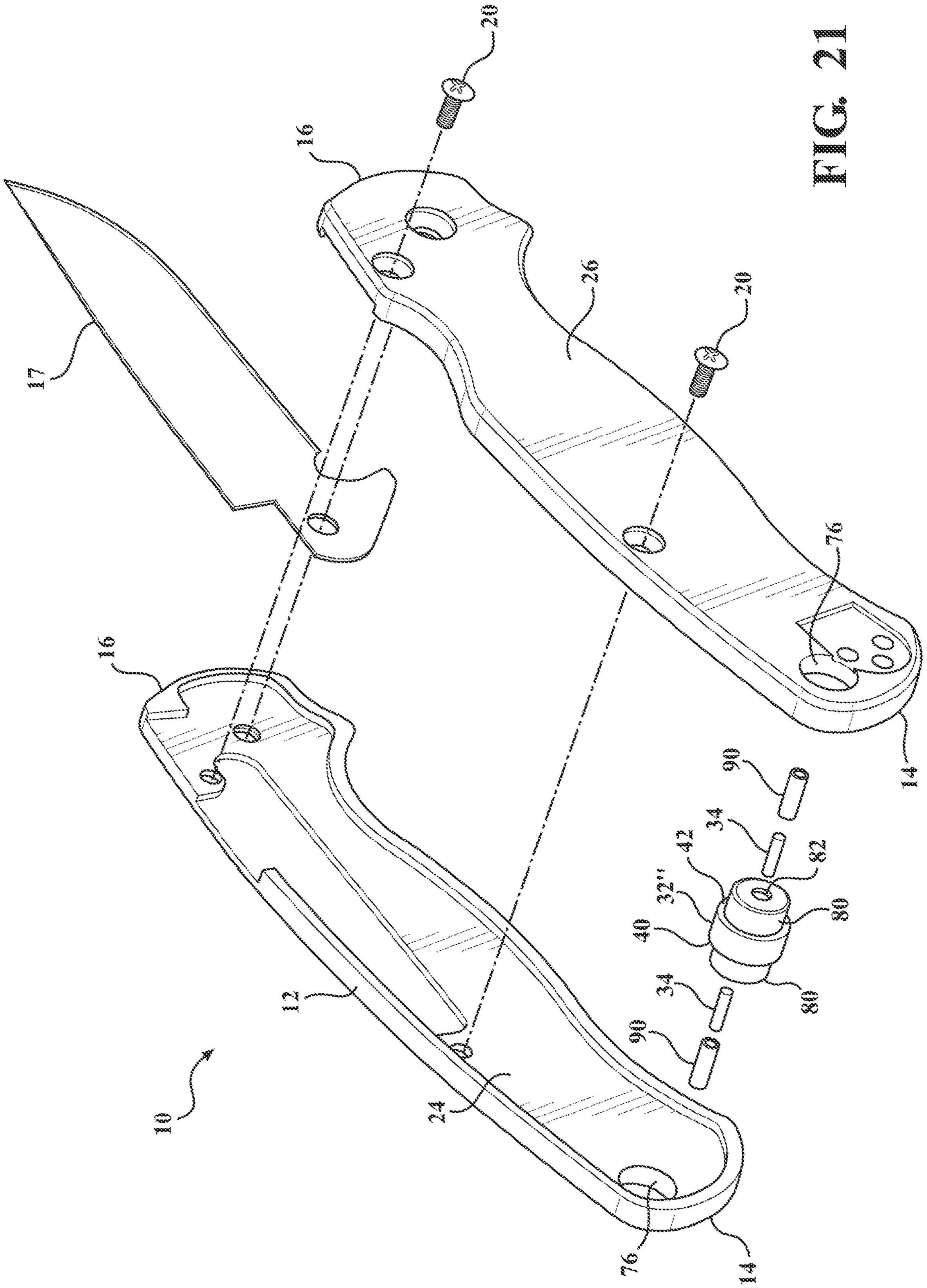
FIG. 21 is an exploded perspective view of another arrangement of the first embodiment of the folding knife assembly illustrated in FIG. 20.
Figure 22:
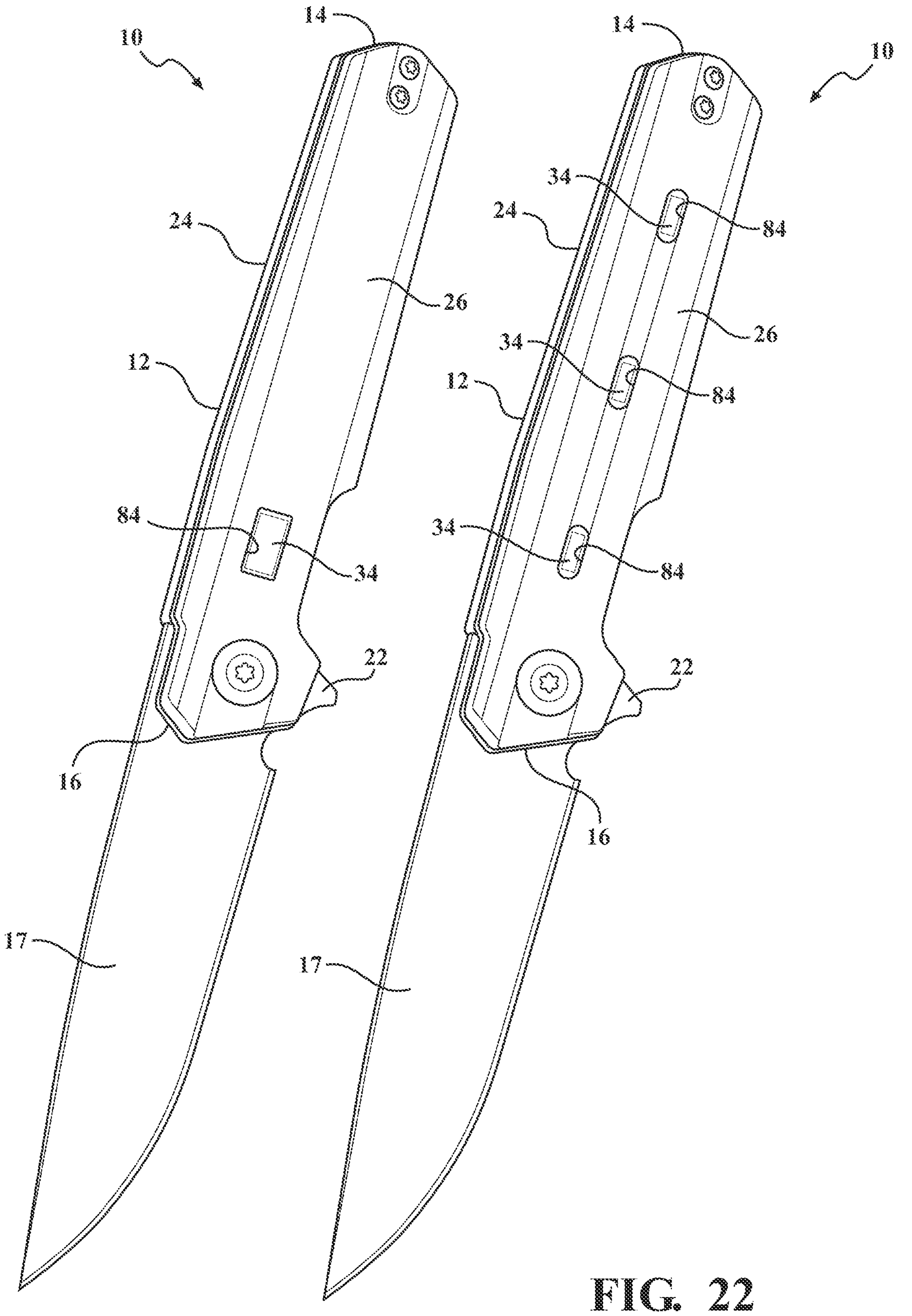
FIG. 22 is a perspective view of the folding knife assembly illustrating one of the first or second handle portions defining a handle opening and an additional tritium vial disposed in the handle opening for allowing tritium illumination to be viewable along the first or second handle portion of the knife assembly.

FIGS. 1-2, 7-8 and 15-22 illustrate a perspective view of a knife assembly 10 in accordance with an aspect of the subject disclosure. As best shown therein, the knife assembly 10 includes a handle 12 which extends from a first knife end 14 to a second knife end 16. The handle 12 may be any size, shape, or configuration for providing a gripping portion of the knife assembly 10. According to one aspect, and as best illustrated in FIGS. 1-2 and 16-22, the knife assembly 10 can be a folding knife assembly in which a knife blade 17 is pivotably connected to the second knife end 14 of the handle 12 and pivotable from a closed position, as illustrated in FIGS. 1 and 16, to an engaged or open position, as illustrated in FIGS. 2, 16 and 22. As will be appreciated by one of skill in the art, when the knife blade 17 is pivotably connected to the handle 12, the knife blade 17 is shorter than the length of the handle 12 so that the knife blade 17 may be folded and be partially and/or fully secured within the handle 12, as illustrated in FIG. 1. As best illustrated in FIGS. 1 and 2, the folding knife assembly 10 includes a thumb stud 18 which extends through the knife blade 17 for allowing a user to quickly and easily pivot the knife blade 17 from the closed position to the engaged or open position. The thumb stud 18 extends through the knife blade 17 such that a first end of the thumb stud 20 is disposed on one side of the knife blade 17 and a second end of the thumb stud 20 is disposed on an opposite side of the knife blade 17. As best illustrated in FIGS. 1-2 and 17-21, preferably one or more fasteners 20 hold the knife blade 17 and the handle 12 together. The fastener 20 may be any fastener that may form a removable connection, a fixed connection, or both. The fastener 20 may be an adhesive, a mechanical fastener, a screw, a bolt, a nut, a rivet, a nail, a mechanical interlock, the like, or any combination thereof.

Figure 7:
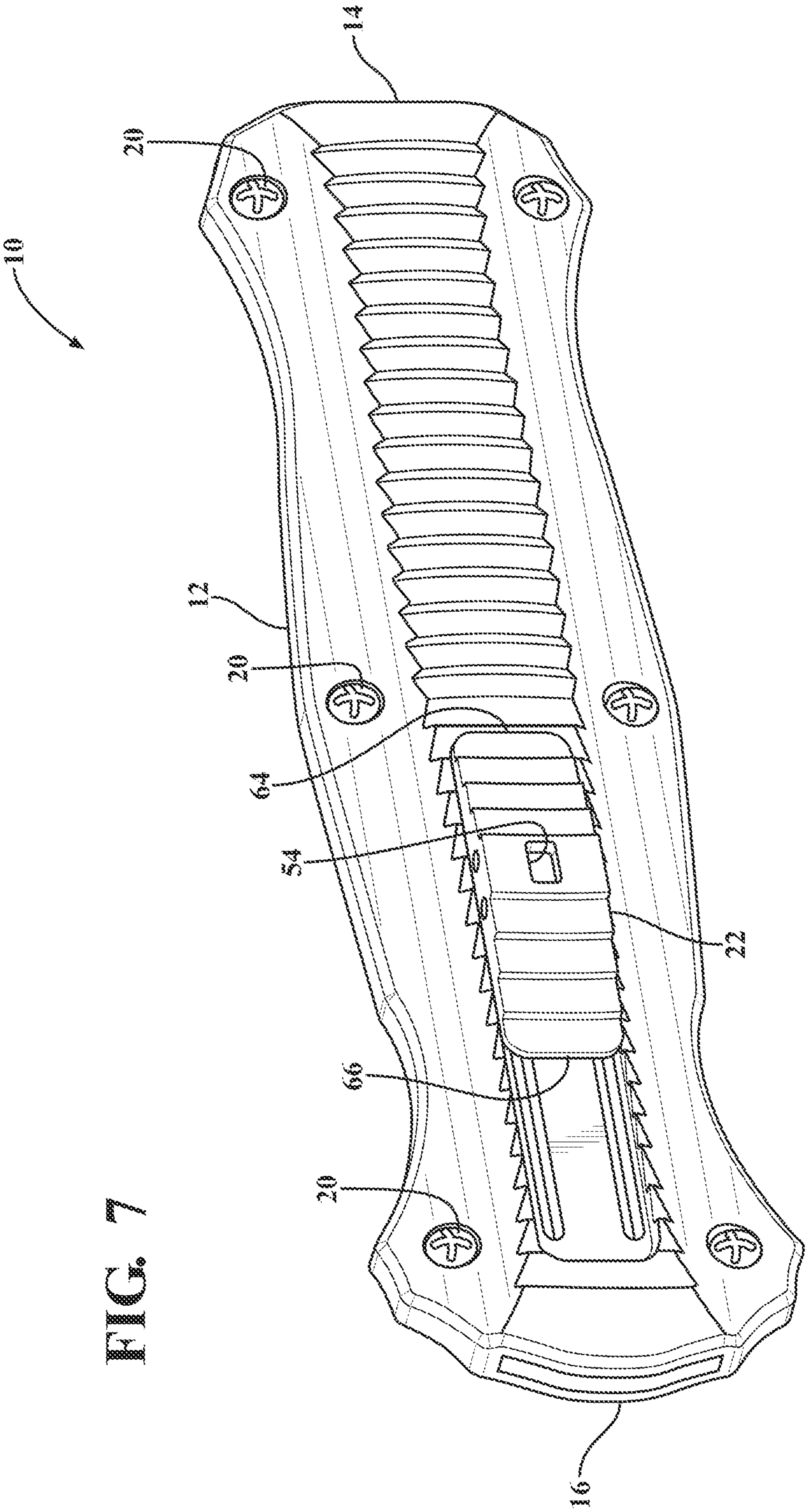
FIG. 7 is a perspective view of an out-the-front ("OTF") knife assembly illustrating a handle extending from a first knife end to a second knife end and a switch button interconnected to the handle for releasing a knife blade from a closed position.
Figure 8:
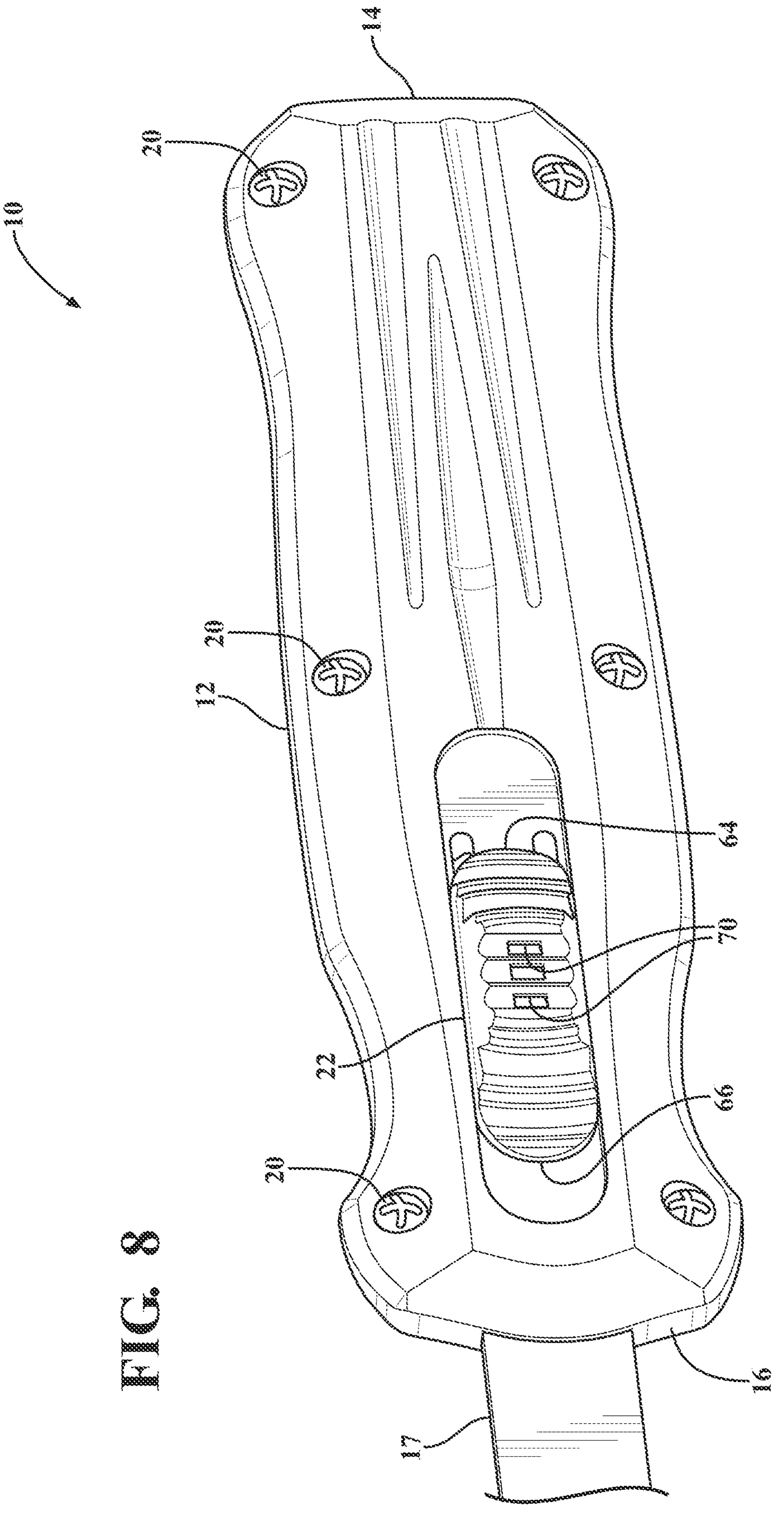
FIG. 8 is a perspective view of the OTF knife assembly illustrating the knife blade extending from the second knife end to define an engaged or open position of the OTF knife assembly.

According to another aspect, and as best illustrated in FIGS. 7 and 8, the knife assembly 10 can be an Out-the-Front ("OTF") knife assembly in which the knife blade 17 is slidably connected to the handle 12 and automatically or manually movable from a closed position, as illustrated in FIG. 7, wherein the knife blade 17 is completely housed within the handle 12 to an engaged position, as illustrated in FIG. 8, wherein the knife blade extends outwardly from the second knife end 16. One or more fasteners 20, such as a mechanical fastener, a screw, a bolt, a nut, mechanical interlock, or the like, can also be used to hold the handle 12 together.

Figure 9:
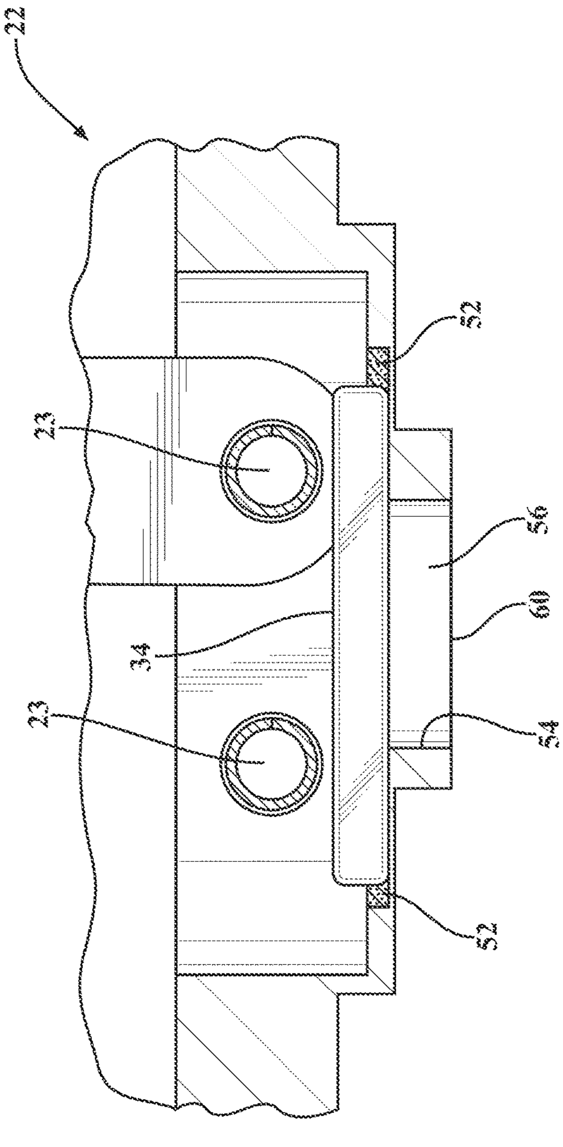
FIG. 9 is a fragmentary, cross-sectional top view of a portion of FIG. 7 illustrating at least one tritium vial housed within the switch button and a lens disposed within an opening defined by the switch button.
Figure 10:
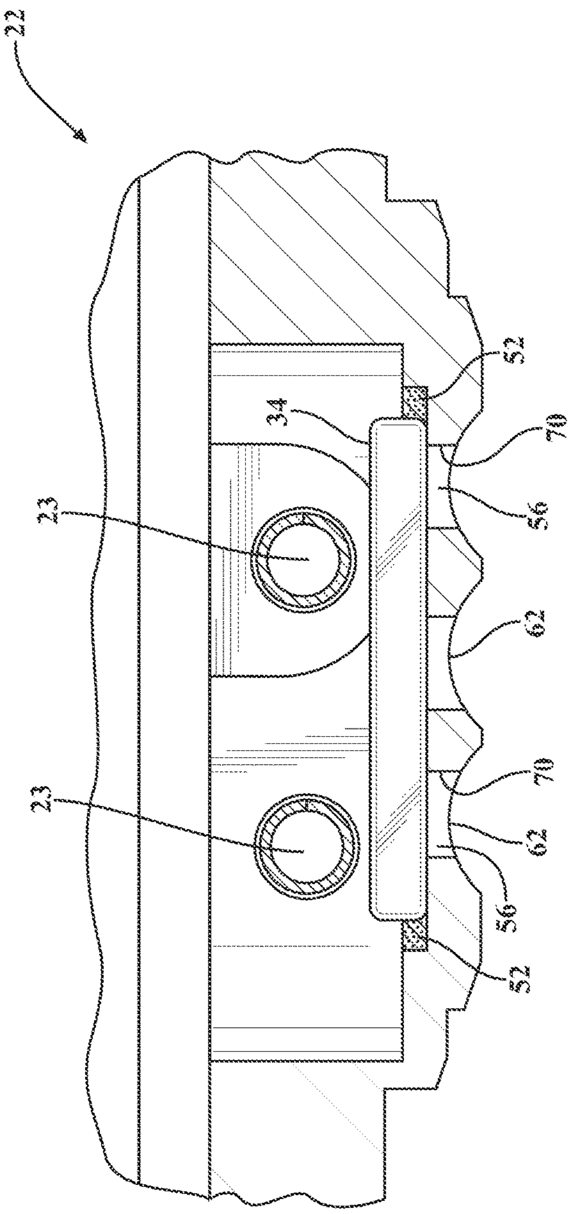
FIG. 10 is a top, fragmentary, cross-sectional top view of a portion of FIG. 8 illustrating a plurality of slits defined by the switch button and a lens disposed within the plurality of slits.

As best illustrated in FIGS. 1-2, 7-8, 16 and 22, both the folding and OTF knife assemblies 10 each include a switch button 22 which is operably interconnected to the handle 12 to release the knife blade 17 from at least one of the closed or open/engaged positions. As best illustrated in FIGS. 9 and 10, the switch button 22 can be slidably interconnected to the handle via a pair of roll pins 23. In the folding knife assembly, the switch button 22 is utilized to release the pivotable knife blade 17 from the engaged or open position illustrated in FIG. 2 and allow the user to pivot the knife blade 17 back into the closed position and protected by the handle 12. In the OTF knife assembly, the switch button 22 can first be utilized to release the slidable knife blade 17 from the closed position illustrated in FIG. 7 and manually or automatically push the slidable knife blade 17 out from the second knife end 16 of the handle 12 and into the engaged position illustrated in FIG. 8. The switch button 22 can also be utilized to release the slideable knife blade 17 from the engaged position and retract the slideable knife blade 17 back into the handle 12. As will be described in more detail below, in either arrangement of the knife assembly 10, at least one vial of tritium is housed within the switch button 22 to allow illumination produced by the tritium vial to highlight the switch button 22 and allow the switch button 22 to be more easily recognized by a user of the knife assembly 10, particularly in dark or night-time conditions.

As best illustrated in FIGS. 3 and 15-22, when the knife assembly 10 is a folding knife assembly, the handle 12 can be comprised of a first handle portion 24 and a second handle portion 26 extending in spaced and parallel relationship with one another from the first knife end 14 to the second knife end 16 to define a working gap 30 of the folding knife assembly 10. As best illustrated in FIG. 1, the knife blade 17 may be partially or fully secured within this working gap 30 along a bottom of the handle 12 when the knife blade 17 is disposed in the closed position. As best illustrated in FIGS. 3-4 and 15-21, at least one spacer 32 is disposed within the working gap 30 and extends between the first and second handle portions 24, 26, preferably along a top portion of the handle 12, for spacing the first and second handle portions 24, 26 from one another and maintaining the working gap 30 in the assembled condition of the folding knife assembly 10. As illustrated in FIGS. 3-6 and 15-21, at least one tritium vial 34 is housed within the at least one spacer 32 for allowing illumination produced by the at least one tritium vial 34 to be viewable within the working gap 30. As will be appreciated by the aforementioned disclosure, the incorporation of the tritium vials 34 into the spacer 32 provides aesthetic benefits to the folding knife assembly 10 by illuminating an area of the knife assembly 10 and allowing a user to see the folding knife assembly 10 at all times, including in dark and night-time conditions.

In a preferred arrangement, the at least one spacer 32 is comprised of a transparent or translucent material, such as an injection molded plastic, for allowing illumination produced by the at least one tritium vial 34 to be viewable by a user through the spacer 32. Although not expressly illustrated, in an alternative arrangement in which the spacer 32 is not comprised of a transparent or translucent material, such as if the spacer 32 was metal, a plurality of holes or slits (not expressly shown) could extend from along an outer surface of the spacer 32 to allow illumination produced by the tritium vial 34 to be viewable by a user through the plurality of holes or slits.

As best illustrated in FIGS. 5-6 and 15-21, in a preferred arrangement, the at least one spacer 32 defines at least one cavity 36 and the tritium vial 34 is disposed within the cavity 36. Furthermore, as best illustrated in FIGS. 5-6 and 17-19, the spacer 32 can define at least one through-hole 38 for receiving the fastener 20 which extends through the through-hole 38 and secures the first and second handle portions 24, 26 to one another. As previously discussed, the tritium vials 34 are often glass vials and thus susceptible to damage and/or breakage. The disposal of the tritium vials 34 within the cavity 36 of the spacer 32 allows the spacer 32 to provide protection from such damage and/or breakage. Put another way, the spacer 32 nests or embeds the tritium vial 34 within its cavity 36, which is then secured between the first and second handle portions 22, 24, to effectively isolate or reduce exposure of the tritium vial 34 to various environmental impacts encountered by the folding knife assembly 10. Furthermore, the placement and securement of the spacer 32 between the first and second handle portions 22, 24 encapsulates the tritium vial 34 within the cavity 36 and further serves to protect the tritium vial 34 from impact, chemicals, water, or other environmental conditions of the knife assembly 10 which could otherwise damage or break the tritium vial 34.

Figure 3:
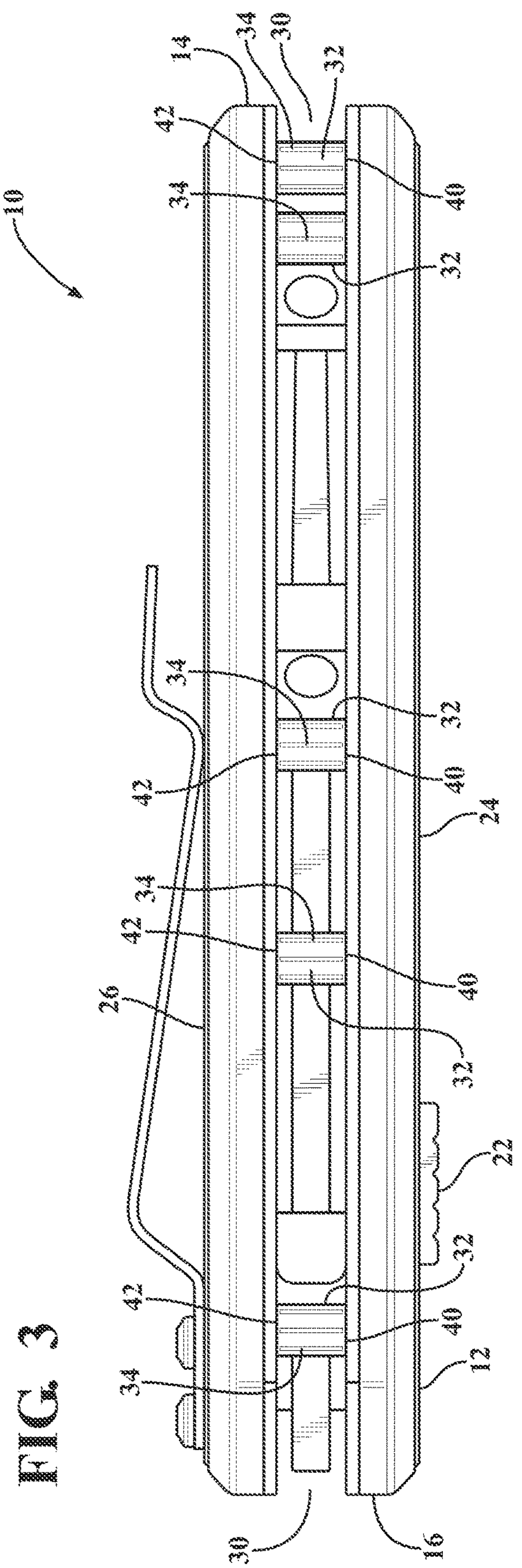
FIG. 3 is a top view of a first embodiment of the folding knife assembly illustrating a first handle portion and a second handle portion disposed in spaced and parallel relationship to one another to define a working gap and a plurality of cylindrical spacers disposed within the working gap and each extending from a first spacer end disposed in abutting relationship to the first handle portion to a second spacer end disposed in abutting relationship with the second handle portion.
Figure 5:
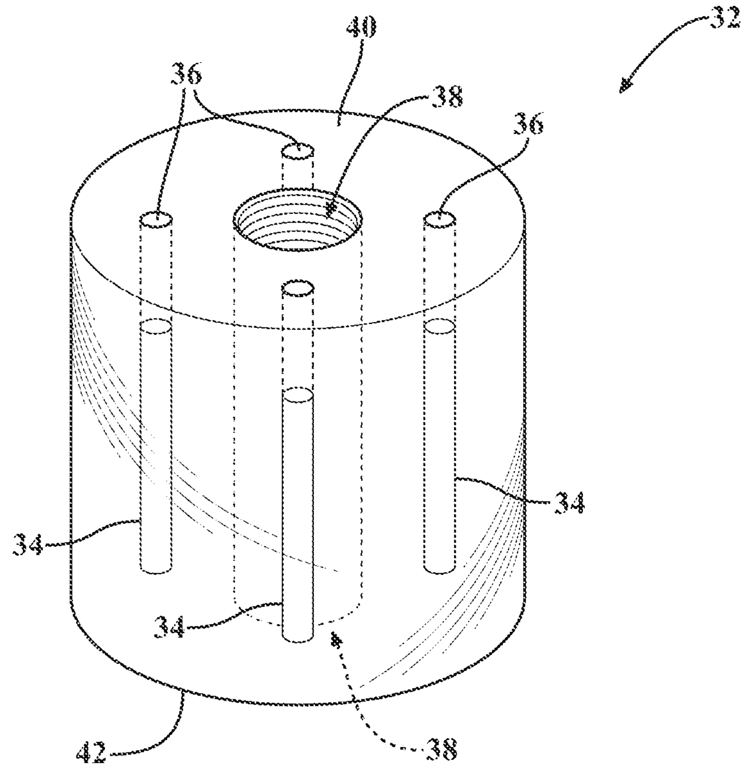
FIG. 5 is a perspective view of one of the cylindrical spacers of FIG. 3 illustrating a plurality of cavities extending from one of the spacer ends, a plurality of tritium vials disposed in a respective one of the plurality of cavities, and a through-hole extending between the first and second spacer ends.

As best illustrated in FIG. 3, according to a first aspect of the subject disclosure, the at least one spacer 32 can include a plurality of spacers 32, preferably cylindrical in shape, which are disposed within the working gap 30 in spaced relationship to one another along a top portion of the handle 12. Each of the plurality of cylindrical spacers 32 extend from a first spacer end 40 disposed in abutting relationship with the first handle portion 24 to a second spacer end 42 disposed in abutting relationship with the second handle portion 26 for spacing the first and second handle portions 24, 26 from one another and maintaining the working gap 30 in the assembled condition of the folding knife assembly 10. As illustrated in FIG. 5, each of the spacers 32 define a through-hole 38 extending from the first spacer end 34 to the second spacer end 36 for receiving a respective fastener to secure the first handle portion 24 to the second handle portion 26.

As further illustrated in FIG. 3, according to a preferred arrangement, each of the plurality of cylindrical spacers 32 defines a plurality of cavities 36 extending from one of the first or second spacer ends 40, 42. In other words, in a preferred arrangement, each of the cavities 36 extend from one of the first or second spacer ends 40, 42 but do not extend all the way across the spacer 32, but rather stop short of the other one of the first or second spacer ends 40, 42. However, each of the cavities 36 could extend across the entire cylindrical spacer 32 without departing from the scope of the subject disclosure. The plurality of cylindrical spacers 32 are disposed in spaced and parallel relationship with one another about each respective spacer 32 and the plurality of tritium vials 34 are then each inserted or embedded into a respective one of the cavities 36. In a preferred arrangement, both the plurality of cavities 36 and the plurality of tritium vials 34 are cylindrical in shape.

Figure 4:
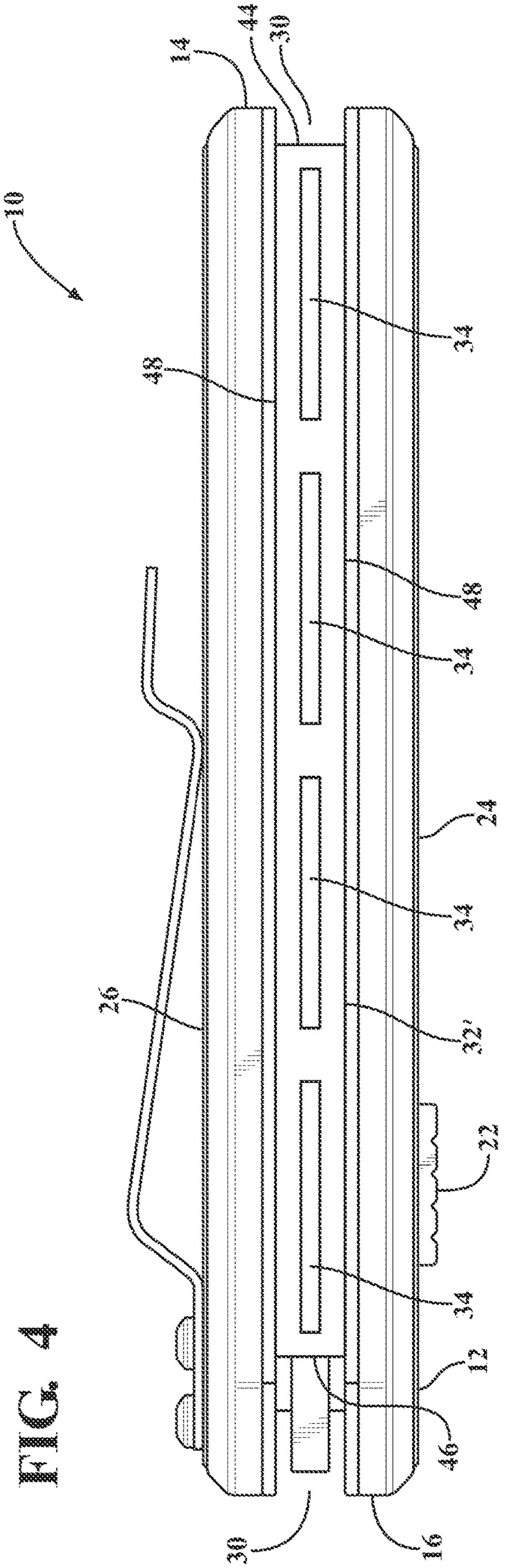
FIG. 4 is a top view of a second embodiment of the folding knife assembly illustrating a first handle portion and a second handle portion disposed in spaced and parallel relationship to one another to define a working gap and a longitudinal spacer extending longitudinally along the knife assembly from a first longitudinal spacer end disposed adjacent the first knife end to a second longitudinal spacer end disposed adjacent the second knife end.

A second embodiment of a spacer 32 including or incorporating tritium is illustrated in FIGS. 5-6 and 15-19 in which, contrary to the cylindrical spacer illustrated in FIGS. 4 and 5, the spacer 32' is comprised of a longitudinal or spine shape that is disposed within the working gap 30 along a top portion of the knife assembly 10. The longitudinal spacer 32' extends longitudinally along the knife assembly 10 from a first longitudinal spacer end 44 disposed adjacent the first knife end 14 to a second longitudinal spacer end 46 disposed adjacent (FIG. 4) or in spaced relationship with (FIGS. 15-19) the second knife end 16 to define a pair of opposing sides 48. As best illustrated in FIGS. 4 and 15-20, each of the pair of opposing spacer sides 48 of the longitudinal spacer 32' are disposed in abutting relationship with one of the first and second handle portions 24, 26. Although the longitudinal spacer 32' is illustrated in FIG. 3 as extending along the entire length of the handle 12, the longitudinal spacer 32' can also be arranged along sections or portions of the handle 12 (such as biased towards or arranged adjacent the first end 14 of the knife assembly, as illustrated in FIGS. 15-19), or somewhere located between the first and second ends 14, 16 without departing from the scope of the subject disclosure. In this second embodiment, the longitudinal spacer 32' takes the place of the one or more of the cylindrical spacers 32 illustrated in FIGS. 3 and 5. Accordingly, as best illustrated in FIGS. 6 and 17-19, the longitudinal spacer 32' defines at least one through-hole 38 extending between the opposing sides 48 for receiving respective fasteners 20 as illustrated in FIGS. 1-2 and 17-19 to secure the first handle portion 24 to the second handle portion 26.

Figure 6:
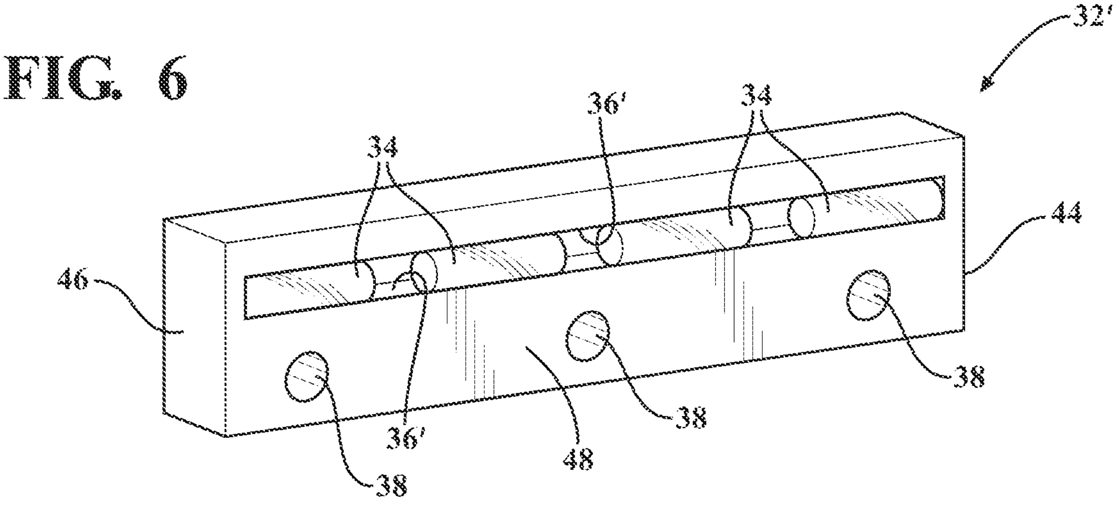
FIG. 6 is a perspective view of the longitudinal spacer of FIG. 4 illustrating a cavity extending longitudinally between the first and second longitudinal ends, at least one tritium vial disposed within the longitudinal cavity, and a plurality of through-holes extending between opposing spacer sides.
Figure 17:
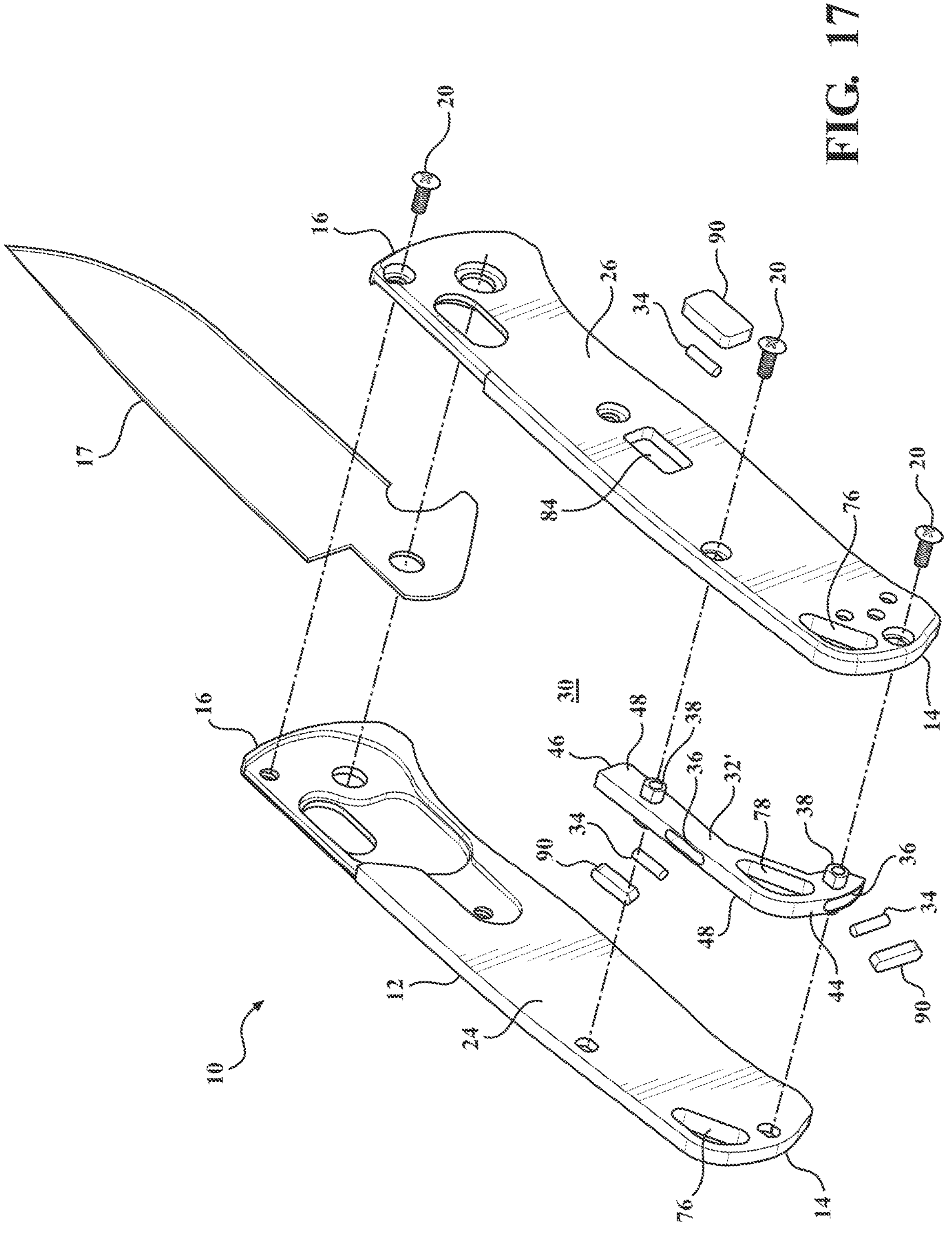
FIG. 17 is an exploded perspective view of another arrangement of the second embodiment of the folding knife assembly and illustrating the first and second handle portions defining respective handle lanyard holes and the longitudinal spacer defining a spacer lanyard hole disposed in aligned relationship with the handle lanyard holes.
Figure 18:
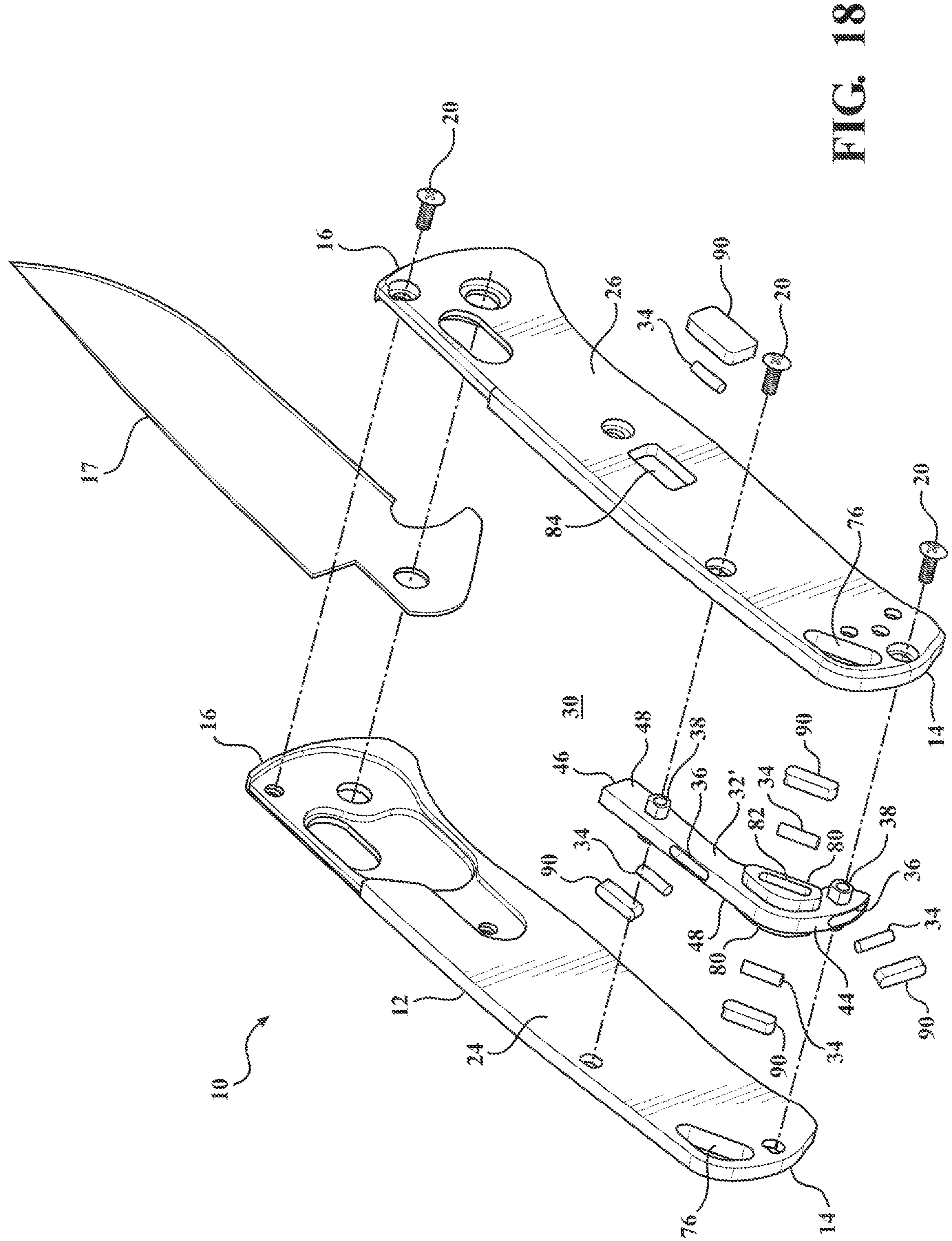
FIG. 18 is an exploded perspective view of another arrangement of the second embodiment of the folding knife assembly and illustrating the longitudinal spacer including a pair of plug portions each disposed in a respective one of the handle lanyard holes and each defining a plug cavity for housing an additional tritium vial.

As best illustrated in FIG. 6, the at least one cavity 36' extends longitudinally along the spacer 32' between the first longitudinal spacer end 44 and the second longitudinal spacer end 46, and the at least one tritium vial 34 is disposed within and extends longitudinally within the longitudinal cavity 36'. In accordance with an aspect, and as illustrated in FIGS. 4 and 17-19, a plurality of tritium vials 34, each of cylindrical shape, are inserted or embedded within the longitudinal spacer 32' and extend serially or longitudinally along the longitudinal spacer 32' in longitudinally spaced relationship to one another between the first and second longitudinal spacer ends 44, 46. FIGS. 4 and 6 illustrate a non-limiting example in which four cylindrical tritium vials 34 are inserted or embedded within the longitudinal spacer 32'. However, more or less tritium vials 34, including even one cylindrical tritium vial 34, could be inserted or embedded within the longitudinal spacer 32' without departing from the scope of the subject disclosure. In a first arrangement, the plurality of cylindrical tritium vials 34 can be encapsulated and secured within a longitudinal tray 50 which is then inserted or embedded within the longitudinal cavity 36'. However, as best illustrated in FIGS. 17-18, in a second arrangement, the longitudinal spacer 32' can define a plurality of cavities 36 disposed in spaced relationship with one another between the first and second longitudinal spacer ends 44, 46 and each of which houses a respective, single tritium vial 34. As further illustrated in FIGS. 17-18, in this arrangement, at least one of the plurality of cavities 36 is disposed at the first longitudinal spacer end 44 for ultimate placement adjacent the first end 14 of the knife assembly 10 and a second one of the plurality of cavities 36 extends along a top portion of the spacer 32' between the first and second longitudinal spacer ends 44, 46 so that the tritium illumination is ultimately viewable by a user from multiple angles of the knife assembly 10 (i.e., at the first knife end 10 and along a top portion of the knife assembly 10). In either aspect, the plurality of tritium vials 34 or the longitudinal tray 50 which encapsulates the tritium vials 34 can be bonded by a bonding material 52 to maintain and secure placement of the tritium 34 within the cavity 36 along the longitudinal spacer 32'.

Figure 19:
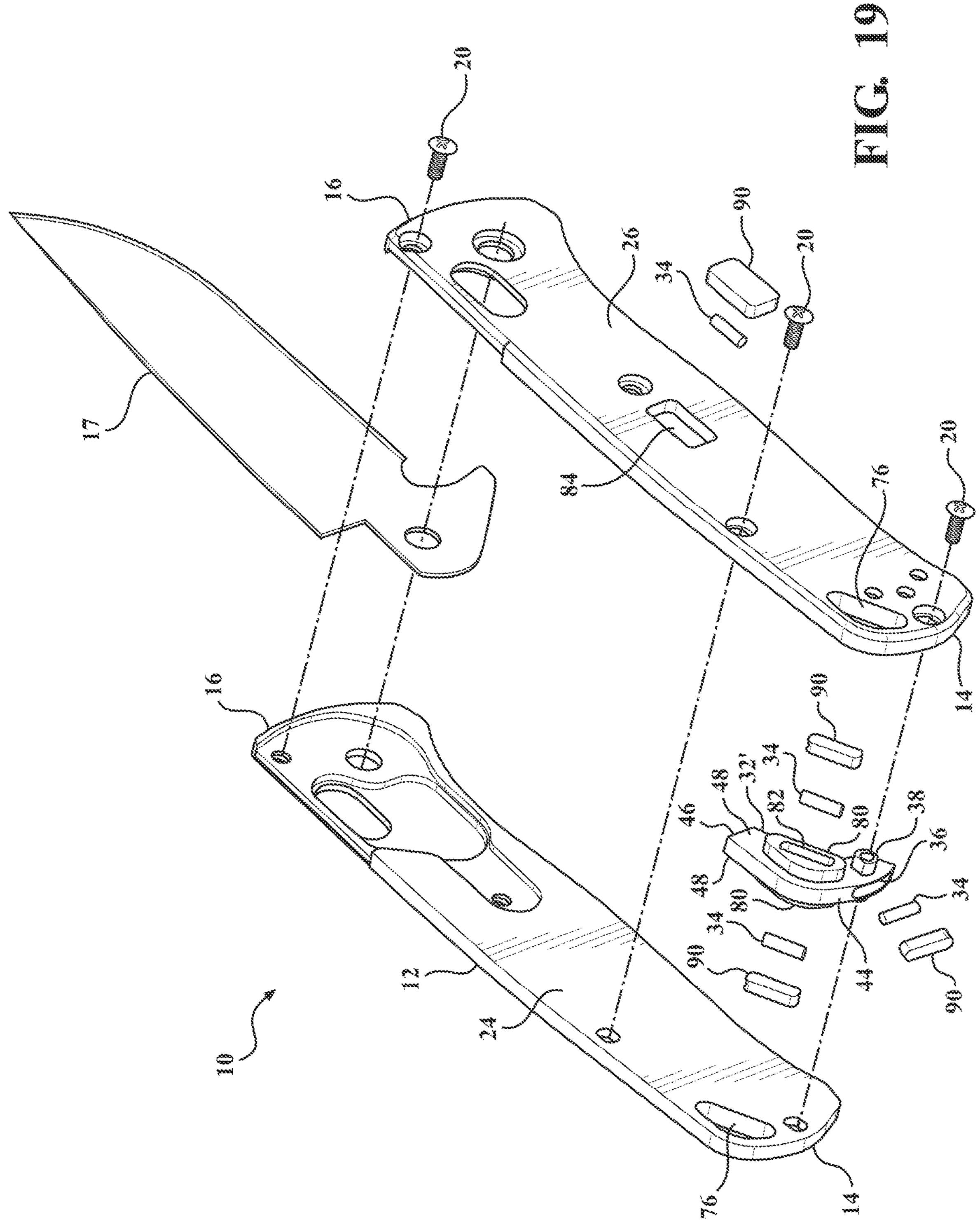
FIG. 19 is an exploded perspective view of another arrangement of the second embodiment of the folding knife assembly illustrated in FIG. 18.

As best illustrated in FIGS. 17-21, each of the first and second handle portions 24, 26 can define respective handle lanyard holes 76 disposed adjacent the first knife end 14 in aligned relationship with one another for receiving a lanyard that would pass through the aligned handle lanyard holes 76 to secure the lanyard to the knife assembly 10. In accordance with another aspect, and as illustrated in FIG. 17, the spacer 32' can define a spacer lanyard hole 78 extending between the opposing sides 48 adjacent the first longitudinal spacer end 44 and which is disposed in aligned relationship with the handle lanyard holes 76 for allowing the lanyard from to be secured to the knife assembly 10, and not preventing use of the lanyard with the knife assembly 10. However, in accordance with another aspect, and as illustrated in FIGS. 18-19, in accordance with another aspect, the spacer 32' can include a pair of plug portions 80 extending outwardly from respective opposing sides 48 of the spacer 32', with each of the plug portions 80 disposed within a respective one of the handle lanyard holes 76 for plugging the handle lanyard holes 76 to prevent a lanyard from passing therethrough. As further illustrated in FIG. 18, each of the pair of plug portions 80 can define a plug cavity 82 and a pair of tritium vials 34 are additionally disposed within the spacer 32' each within a respective plug cavity 82 for allowing tritium illumination to be viewable through the handle lanyard holes 76. This arrangement advantageously allows tritium illumination to also be viewable by a user through both of the first and second handle portions 24, 26 and thus on both sides of the knife assembly 10, in addition to along the other portions of the knife assembly 10 described previously, for improving visibility of the tritium illumination from multiple angles of the knife assembly 10.

As best illustrated in FIGS. 20-21, according to a third embodiment, the spacer 32" is arranged as a lanyard hole plug disposed between the first and second handle portions 24, 26 and within the handle lanyard holes 78 for plugging the handle lanyard holes 78 and preventing any lanyard from passing therethrough. Put another way, as will be appreciated in view of the respective Figures and the following description, the lanyard hole plug also functions as the spacer 32" for spacing the first and second handle portions 24, 26 from one another and maintaining the working gap 30 in the assembled condition of the knife assembly 10. Similar to the first embodiment, the spacer 32" (arranged as the lanyard hole plug) is generally cylindrical, oval or oblong shaped and extends between a first spacer end 40 disposed in abutting relationship with the first handle portion 24 and a second spacer end 42 disposed in abutting relationship with the second handle portion 26. A pair of plug portions 80 extend outwardly from respective first and second spacer ends 40, 42 and are each disposed within a respective one of the handle lanyard holes 76 for plugging the handle lanyard holes 76 to prevent a lanyard from passing therethrough. As further illustrated in FIGS. 20-21, each of the plug portions 80 can define a plug cavity 82 and a pair of tritium vials 34 are disposed within the spacer 32" each within a respective plug cavity 82 for allowing tritium illumination to be viewable through the handle lanyard holes 76. This arrangement allows tritium illumination to be viewable by a user through both of the first and second handle portions 24, 26 and thus on both sides of the knife assembly 10. Incorporation of tritium into the spacer 32" arranged as a lanyard hole plug also allows tritium to be easily added or customized into a knife assembly 10 which includes handle lanyard holes 76.

Figure 23:
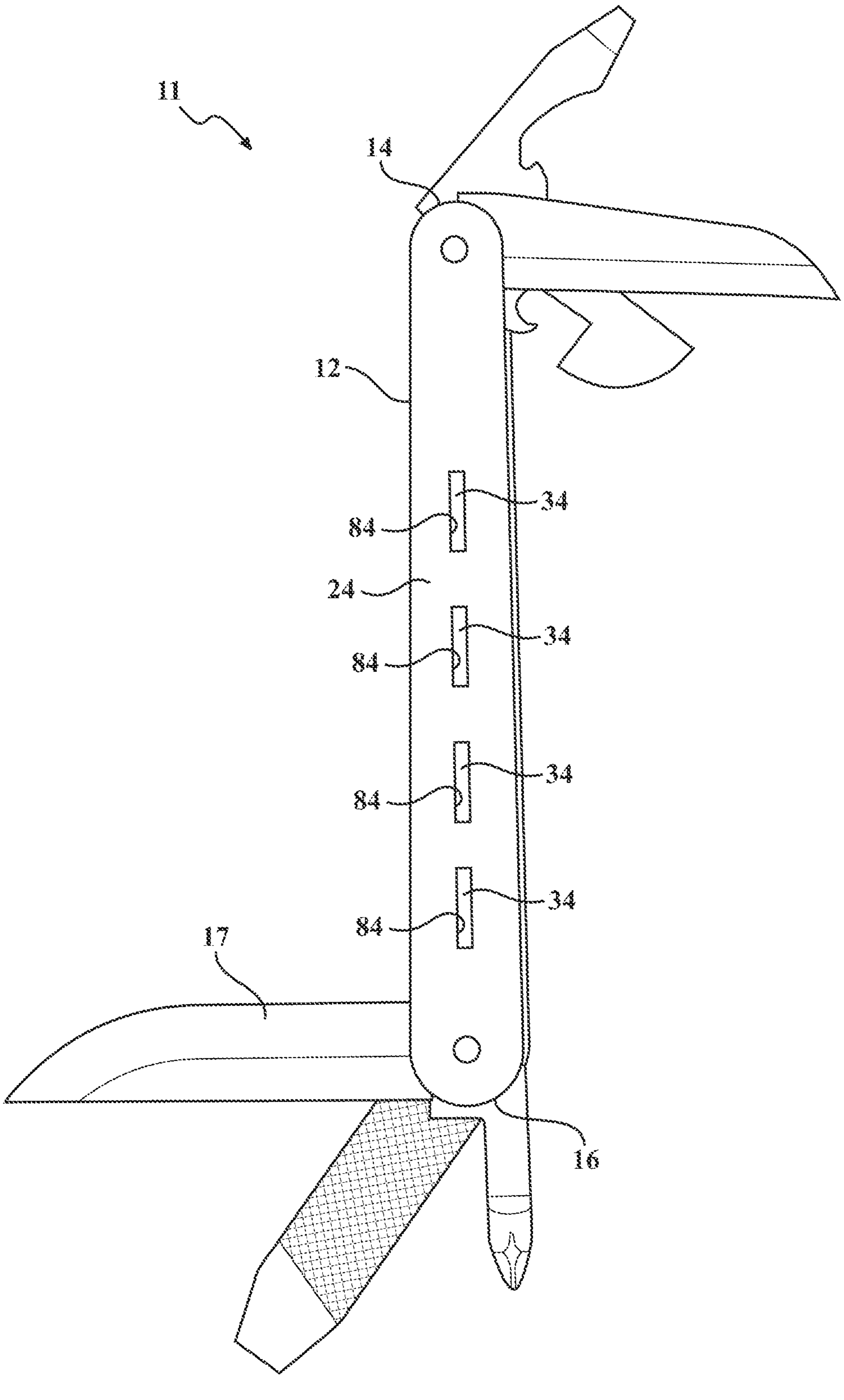
FIG. 23 is a perspective view of a multi-tool assembly also incorporating the tritium illumination into a first or second handle portion.

With reference to FIGS. 17-20 and 22, the knife assembly 10 can also include other ways of incorporating tritium into the first and second handle portions 24, 26. More specifically, each of the first and second handle portions 24, 26 can define at least one handle opening 84 and an additional tritium vial 34 can be housed within this handle opening 84 for allowing additional tritium illumination to be viewable from both sides of the knife assembly 10 (i.e., along the first and second handle portions 24, 26). Additionally, incorporation of tritium into the first and second handle portions 24, 26 also allows tritium to be easily added or customized into a knife assembly 10, since these handle portions 24, 26 can be manufactured specific to the knife assembly 10, and/or the handle portions 24, 26 can be removed and replaced by a user to incorporate the tritium components. In other words, the first and second handle portions 24, 26 (without the handle openings and accompanying tritium illumination) are commonly sold and manufactured as knife scales which can be secured to the knife assembly 10, and thus in this case provide an after-market upgrade to incorporate tritium illumination into a folding knife assembly that was not previously manufactured and sold with tritium illumination as an option. As illustrated in FIG. 23, a multi-tool assembly 11 including a pivotable knife blade 17 can also incorporate tritium 34 into the first and second handle portions 24, 26 in accordance with this aspect of the disclosure, with similar components to the knife assembly 10 described above incorporated herein and labeled with the same numerals in FIG. 23.

As previously discussed, the cylindrical vials filled with tritium 34 are often glass vials and thus susceptible to damage and/or breakage. The disposal of the tritium vials 34 within the longitudinal cavity 36' of the longitudinal spacer 32' allows the longitudinal spacer 32' to provide protection from such damage and/or breakage. Put another way, the spacer 32' nests or embeds the tritium vials 34 within its longitudinal cavity 36', which is then secured between the first and second handle portions 24, 26 to effectively isolate or reduce exposure of the tritium vials 34 to various environmental impacts encountered by the folding knife assembly 10. Furthermore, the placement and securement of the longitudinal spacer 32' between the first and second handle portions 24, 26 encapsulates the tritium vials 34 within the longitudinal cavity 36' and further serves to protect the tritium vials 34 from impact, chemicals, water, or other environmental conditions of the folding knife assembly 10 which could otherwise damage or break the tritium vial 34.

Figure 28:
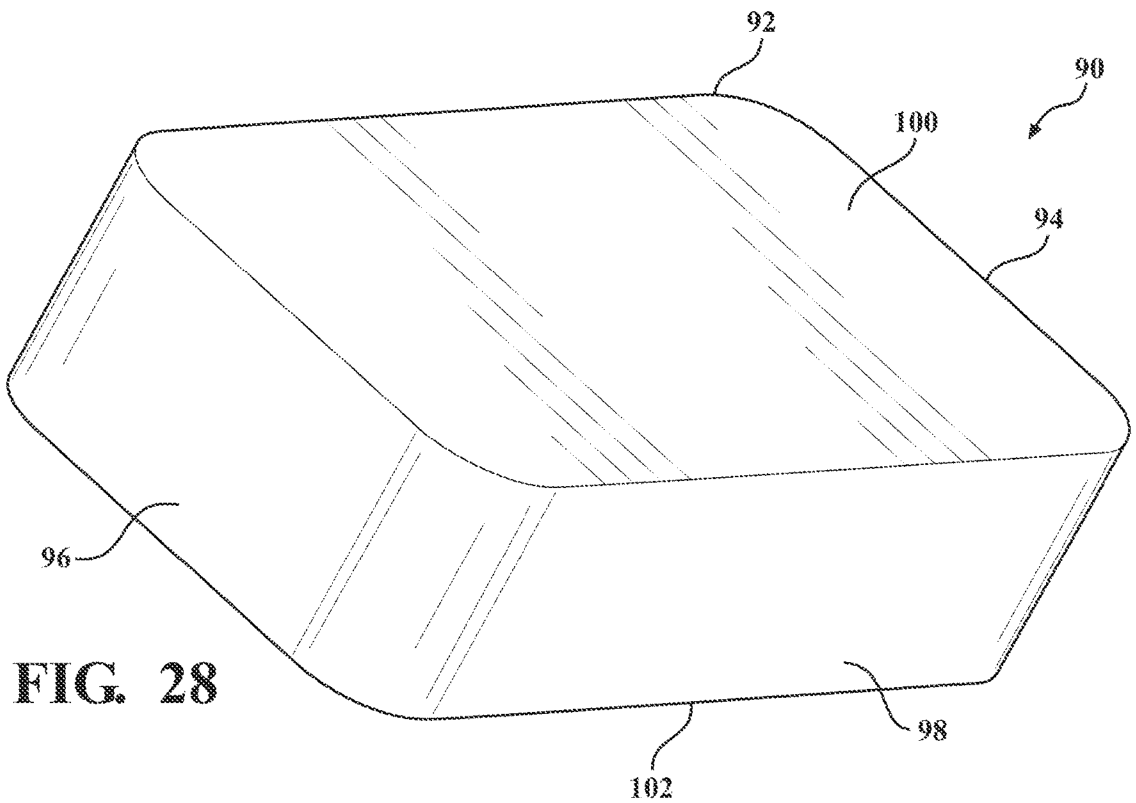
FIG. 28 is a front perspective view of a second embodiment of the housing.
Figure 29:
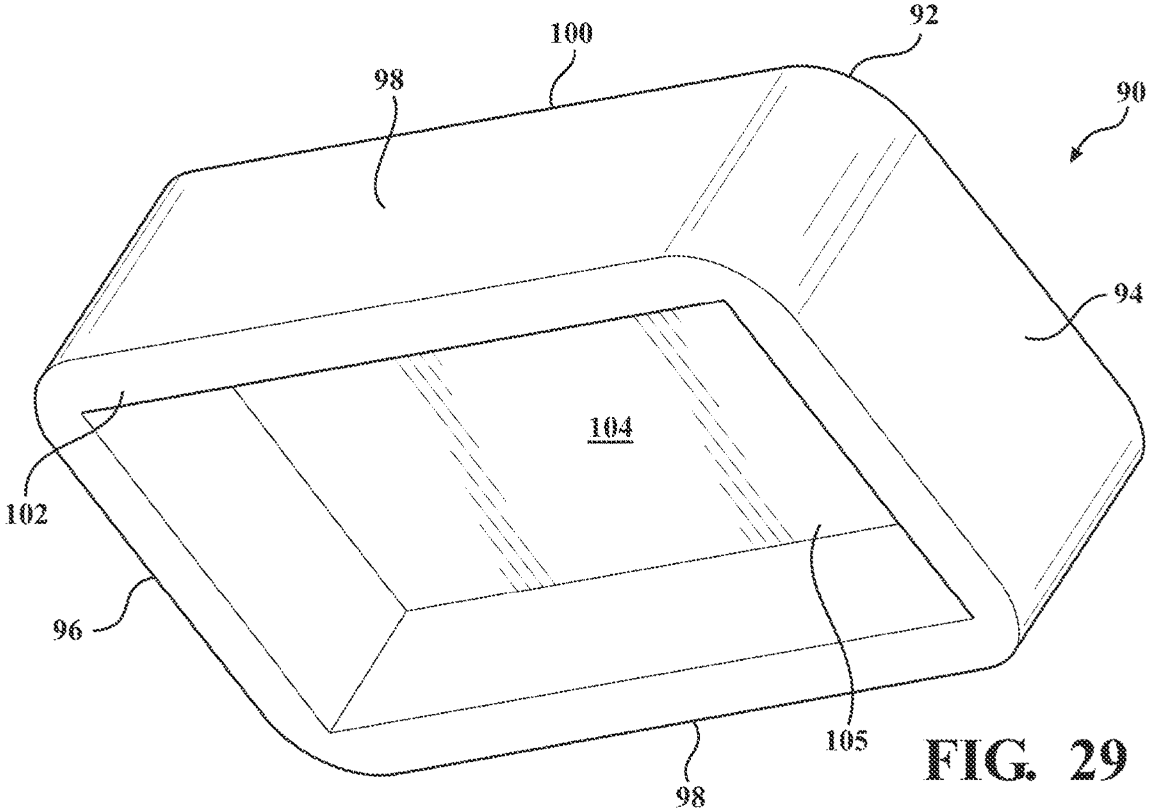
FIG. 29 is a rear perspective view of the second embodiment of the housing.

As illustrated in FIGS. 17-20 and 24-32, the tritium vials 34 can additionally be protected within the cavities 36, 82 through the use of a housing 90 which is also inserted within the respective cavity 36, 82 or handle opening 84 to enclose or encapsulate the tritium vial 34 within the cavity 36, 82 or handle opening 84 and isolate the tritium vial 34 from an environment of the knife assembly 10. As best illustrated in FIGS. 24-29, according to an aspect, the housing 90 includes a body 92 extending from a first housing end 94 to a second housing end 96 to define a pair of housing sides 98, a housing top 100, and a housing bottom 102. As illustrated in FIGS. 24-27, in a first arrangement of the housing 90, the body 92 has a generally cylindrical shape, for incorporation into the cavities 36 defined by the spacer 32' or the plug cavities 82 defined by the plug portions 80. However, as illustrated in FIGS. 28-29, in a second arrangement of the housing 90, the body 92 has a generally rectangular shape, for incorporation into the handle openings 84 defined by the first and second handle portions 24, 26. As further illustrated in FIGS. 30-32, in a third arrangement of the housing 90, the body 92 has a generally disc or circular shape, such as for incorporation into the thumb stud 18 of the knife assembly 10 when a tritium vial is housed therein.

Figure 24:
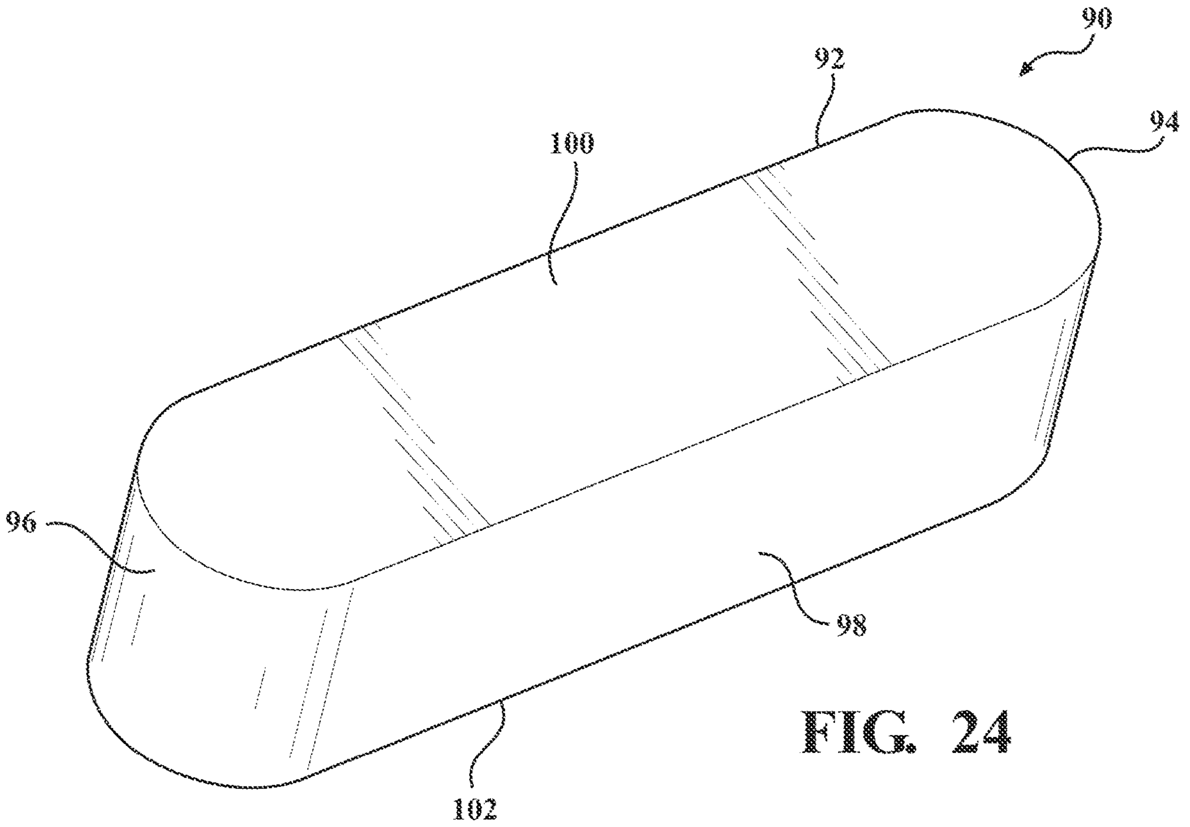
FIG. 24 is a front perspective view of a first embodiment of a housing for encapsulating the at least one tritium vial with the cavity.
Figure 25:
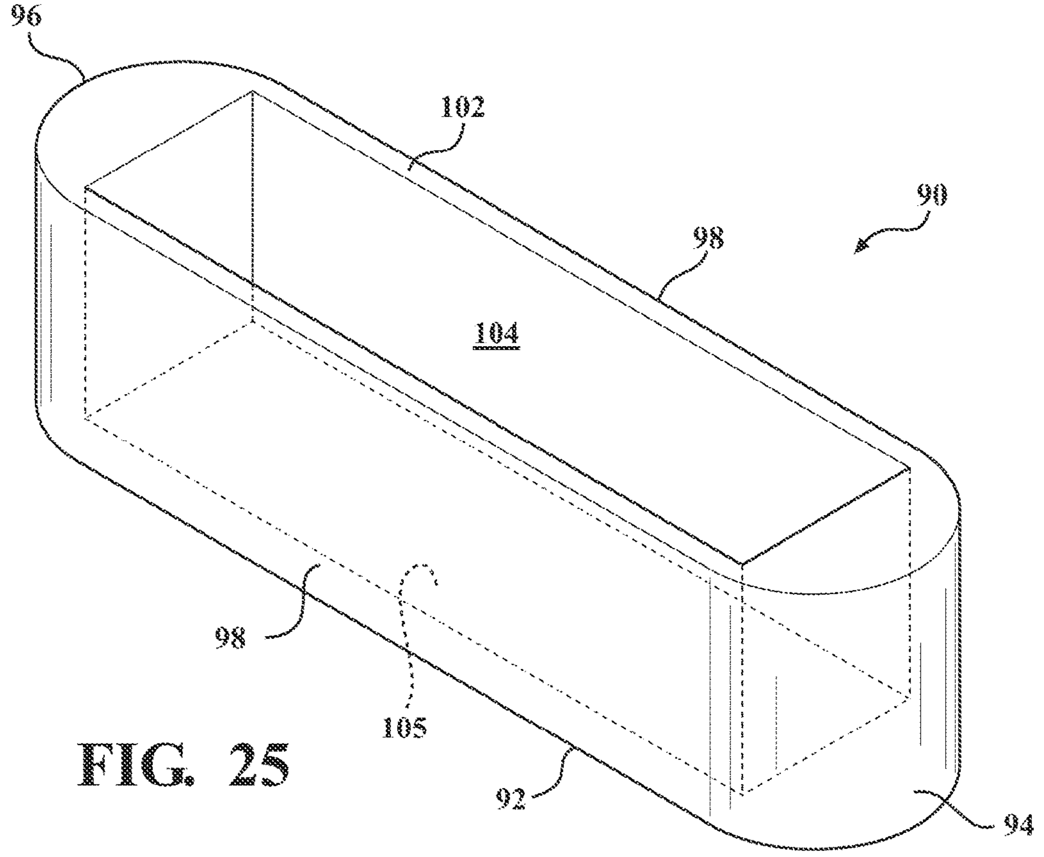
FIG. 25 is a rear perspective view of the first embodiment of the housing.
Figure 32:
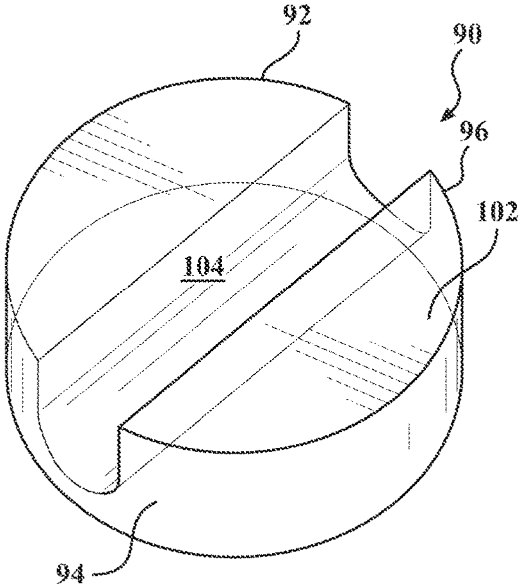
FIG. 32 is a rear perspective view of the third embodiment of the housing.

As illustrated in FIGS. 25, 29 and 32, the body 92 defines a hollow 104 extending inwardly from the housing bottom 102 to an inner hollow surface 105 disposed in spaced relationship with the housing top 100. In other words, the hollow 104 does not extend entirely from the housing bottom 102 to the housing top 104, but stops short of the housing top 104 to provide a portion of the body 92 which defines the inner hollow surface 104. As best illustrated in FIGS. 17-20, the tritium vial 34 is disposed or encapsulated within the hollow 104 when the housing 90 is utilized to additionally protect the tritium from an environment of the knife assembly 10, namely by way of the housing top 100 of the housing 90. Put another way, the tritium vials 34 are nested between the housing 104 and the respective cavities 36, 82 or the handle opening 84, and isolated from the environment of the knife assembly 10 by the housing top 100, to provide additional protection for the tritium vials 34. Although not expressly illustrated, the tritium vial 34 can be secured within the hollow 104 via an adhesive, bonding material or the like to maintain and secure the tritium vial 34 within the housing 90. With reference to FIGS. 24-25, when the body 92 is generally cylindrical shaped, the hollow 104 is shaped to receive a cylindrical glass vial of tritium. Alternative, with reference to FIGS. 28-29, when the body 92 is generally rectangular shaped, the hollow 104 is shaped to receive a rectangular glass vial of tritium.

Figure 26:
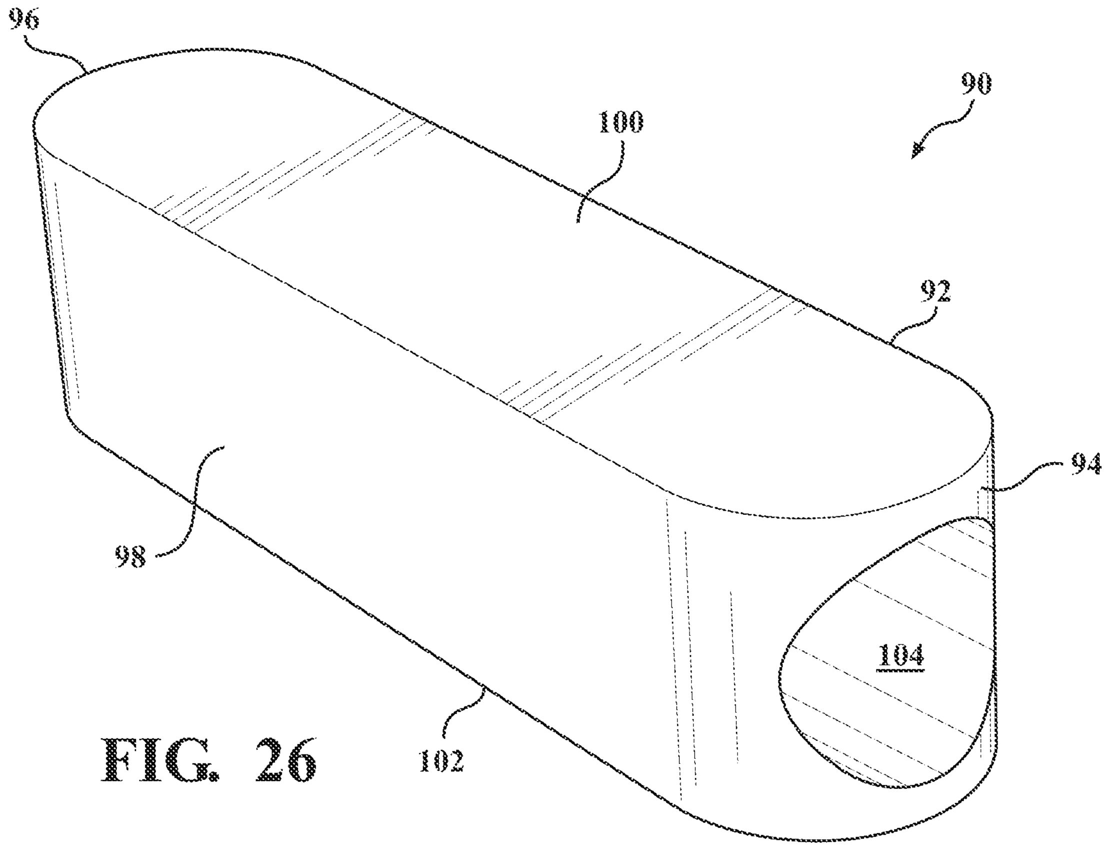
FIG. 26 is a perspective view of an alternative arrangement of the first embodiment of the housing.
Figure 27:
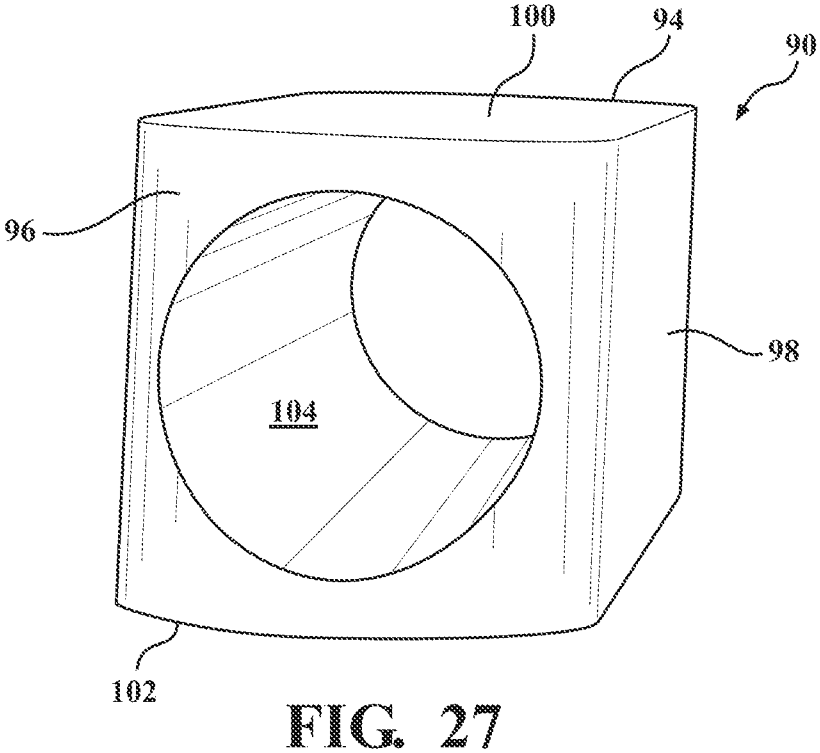
FIG. 27 is an end view of the housing of FIG. 26.

As best illustrated in FIGS. 26-27, in accordance with an alternative arrangement, instead of extending inwardly from the housing bottom 102, the hollow 104 can extend between the first and second housing ends 94, 96 in parallel and spaced relationship with the housing sides 98. In this arrangement, the hollow 104 allows for the tritium vial 34 to be inserted into the body 92 through one of the first or second housing ends 94, 96, instead of through the housing bottom 102, as required by the other aspects. Thus, in this arrangement, the tritium vial 34 could be inserted into the housing 90 before the housing is placed within one of the cavities 36 illustrated in FIGS. 17-20, to protect the tritium vial during the insertion process. The longitudinally extending hollow 104 also facilitates a slimmer, thinner construction of the housing 90 having thinner walls relative to the other aspects.

The body 92 of the housing 90 is comprised of a transparent or translucent material, such as an injection molded plastic, for allowing illumination produced by the tritium vial 34 to be viewable by a user through the body 92, when the tritium vial 34 is additionally protected within the cavities 36, 82 by the housing 90. The body could also be comprised of glass, sapphire, mineral, silicone, or other type of transparent or translucent material without departing from the scope of the subject disclosure. In another arrangement, the body 92 of the housing 90 could additionally be comprised of a colored, plastic material, such as polycarbonate, nylon, or the like, for providing colored distinction and brightness to the tritium illumination during a daylight use of the housing 90. In an additional arrangement, the body 92 could also be comprised of a phosphorescent, colored plastic material to provide an additional glowing effect to the illumination produced by the tritium vial. The injection molding process for forming the housing 90 also allows for mass production of the housing 90, as well as offering the ability to change a color of the body 92 via a simple resin change.

As previously mentioned, the present disclosure also relates to a knife assembly 10 which includes switch buttons 22 incorporating tritium, such as the exemplary switch buttons 22 illustrated in FIGS. 1-2 and 7-8. As best illustrated in FIGS. 9-12, the at least tritium vial 34 is housed within the switch button 22. Furthermore, as best illustrated in FIGS. 9-10 and 13, the switch button 22 defines at least one opening 54 for allowing illumination produced by the tritium vial 34 to be viewable by a user of the knife assembly 10. A lens 56 comprised of a transparent or translucent material, such as glass or an injection molded plastic, is disposed within the at least one opening 54 to encapsulate the tritium vial 34 within the switch button 22. Encapsulation of the tritium vial 34 with the lens 56 serves to protect the tritium vial 34 from impact, chemicals, water, or other environmental conditions of the folding knife assembly 10 which otherwise could damage or break the tritium vial 34. Furthermore, not only does the lens 56 protect the tritium vial 34, but its transparent or translucent composition allows illumination produced by the tritium vial 34 to be viewable by the user through the at least one opening 54 defined by the switch button 22.

Figure 11:
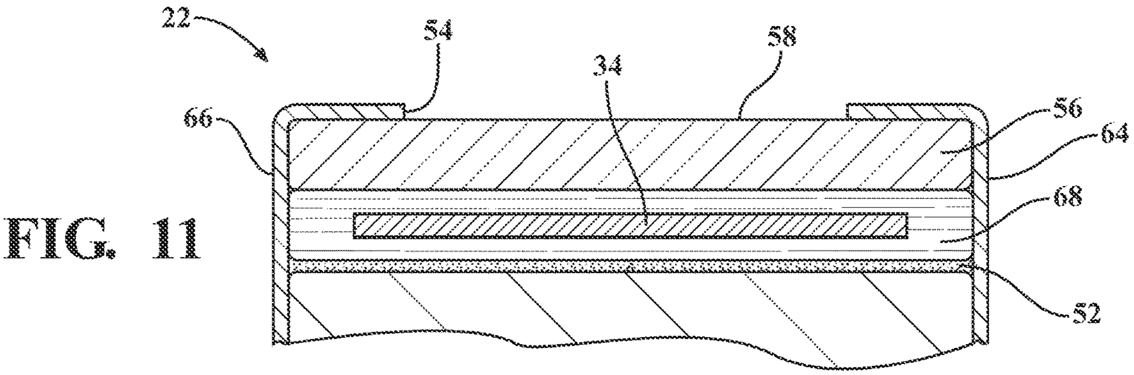
FIG. 11 is a cross-sectional side view of the switch button illustrating the at least one tritium vial disposed within a wafer that is sandwiched between a lens and a bonding material.
Figure 12:
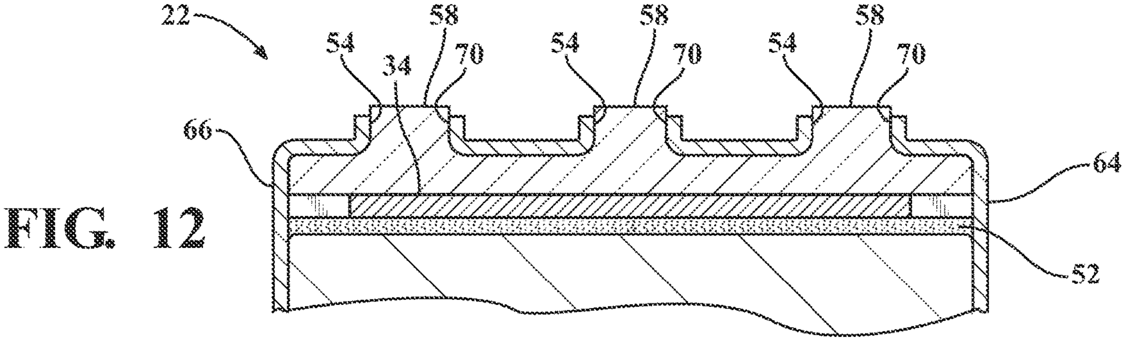
FIG. 12 is a cross-sectional side view of the switch button illustrating a raised portion of the lens which projects outwardly from the plurality of slits and away from the switch button.
Figure 13:
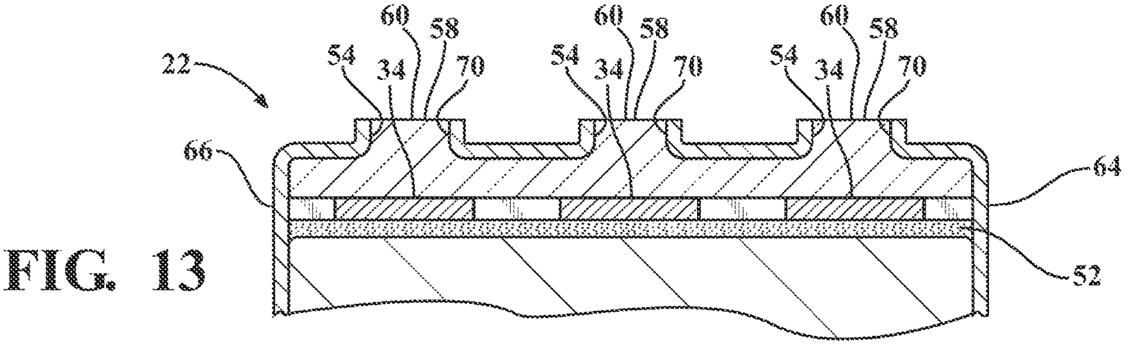
FIG. 13 is a cross-sectional side-view of the switch button illustrating a plurality of vials of tritium sandwiched between a lens disposed adjacent the plurality of slits and a bonding material and aligned with the plurality of slits.

According to an aspect, and as illustrated in FIGS. 9-13, various shapes of the lens 56 can be utilized to magnify, amplify, or extend the visibility of this tritium illumination. For example, as best illustrated in FIG. 12, the lens 56 can include at least one raised portion 58 which extends outwardly from the at least one opening 54 and away from the switch button 22 to allow illumination produced by the at least one tritium vial 34 to be viewable by a user from multiple angles relative to the knife assembly. Although not expressly illustrated, each of the raised portions 58 of the lens 56 could also have different shapes, such a domed/curved shape. As illustrated in FIG. 13, each of the raised portions 58 can have a flat surface 60 which can be situated flush with an outside surface of the switch button 18. Furthermore, as best illustrated in FIG. 10, the lens 56 can have a curved surface 62 which follows the contour of an outside surface of the switch button 22.

As illustrated in FIGS. 11-13, the switch button 22 extends longitudinally from a first switch button end 64 to a second switch button end 66 and the at least one tritium vial 34 extends longitudinally along the switch button 22 between the first and second switch button ends 64, 66. Furthermore, a bonding material 52 can be used to secure the at least one tritium vial 34 within the switch button 22. As best illustrated in FIGS. 11-13, in an arrangement, the at least one tritium vial 34 is disposed in sandwiched relationship between the lens 56 and the bonding material 52. However, as best illustrated in FIGS. 9-10, in an alternative arrangement, the bonding material 52 can be disposed adjacent the ends of the tritium vial 34. As best illustrated in FIG. 11, the tritium vial 34 can also be encapsulated within a tray or wafer 68 which is disposed within the switch button 22 in sandwiched relationship between the lens 56 and the bonding material 52.

Figure 14A:
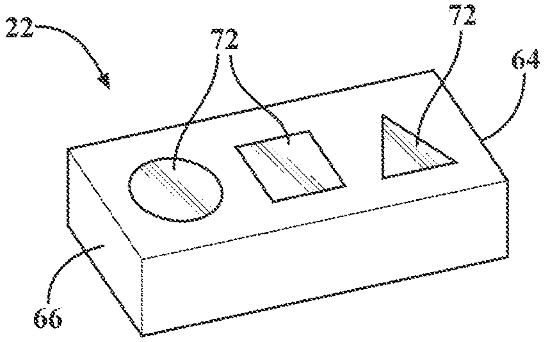
FIG. 14A is a perspective view of the switch button illustrating a series of personalized shapes defined by the switch button.
Figure 14B:
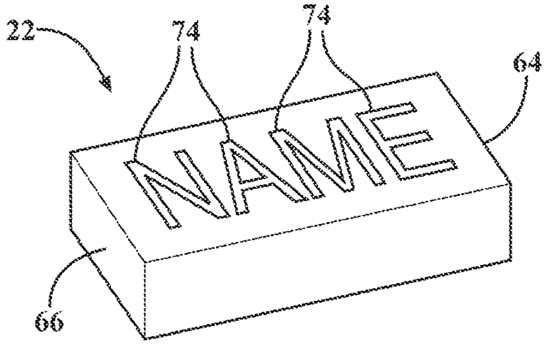
FIG. 14B is a perspective view of the switch button illustrating a series of personalized letters defined by the switch button.
Figure 15:
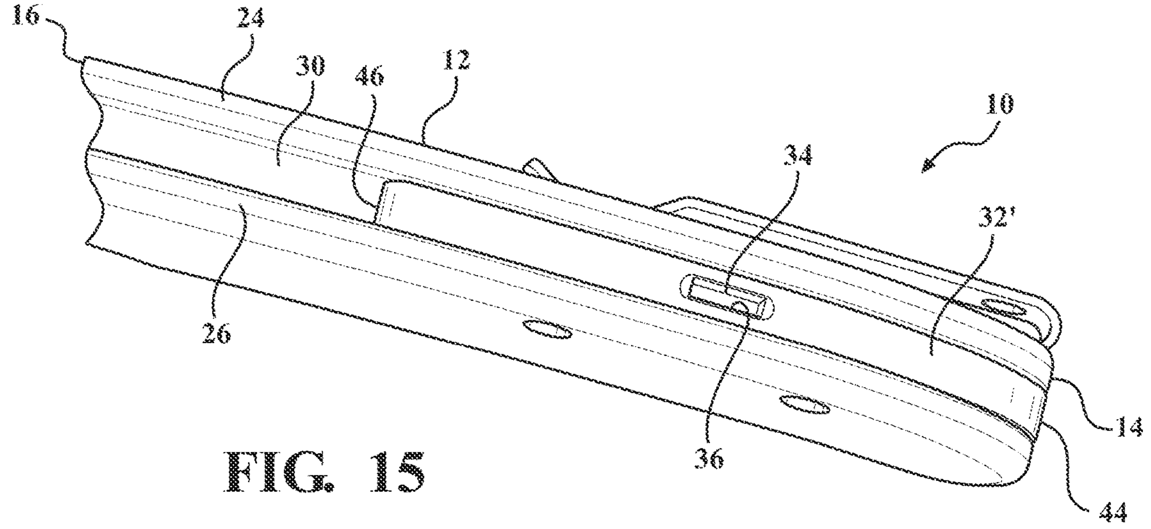
FIG. 15 is a partial perspective view of the second embodiment of the folding knife assembly illustrating the longitudinal spacer extending longitudinally along the knife assembly from the first longitudinal spacer end disposed adjacent the first knife end to the second longitudinal spacer end disposed is spaced relationship with the second knife end.

As best illustrated in FIGS. 10 and 12-13, in an arrangement, the at least one opening 54 defined by the switch button 22 can include a plurality of slits 70 extending parallel to the first and second switch ends 64, 66. However, as best illustrated in FIGS. 14A and 14B, in an alternative arrangement the at least one opening 54 defined by the switch button 22 can include a plurality of personalized shapes 72 or a plurality of personalized letters 74 to personalize the knife assembly 10 to a particular company, person, or organization and allow the personalized shapes or letters 72, 74 to be visible and legible during dark or night-time conditions. Accordingly, the personalized series of shapes or letters 72, 74 provides for unique, personalization of the folding knife assembly 10 which are not provided for in the previously described aspects.

As best illustrated in FIG. 13, the at least one tritium vial 34 can include a plurality of tritium vials 34 which are disposed within the switch button 22 in transverse relationship to the longitudinal length of the switch button 22 and in aligned relationship with the plurality of slits 70. Similar to the single tritium vial arrangement, a lens 56 comprised of transparent or translucent material, such as glass or an injection molded plastic, can be disposed adjacent the plurality of slits 70 and adjacent or in abutting relationship with an inner surface of the switch button 22 which is arranged opposite the outside surface. The plurality of tritium vials 34 can be sandwiched between the lens 56 and a bonding material 52, such as glue, sealer, or the like, for maintaining the plurality of tritium vials 34 within the switch button 22

Figure 30:
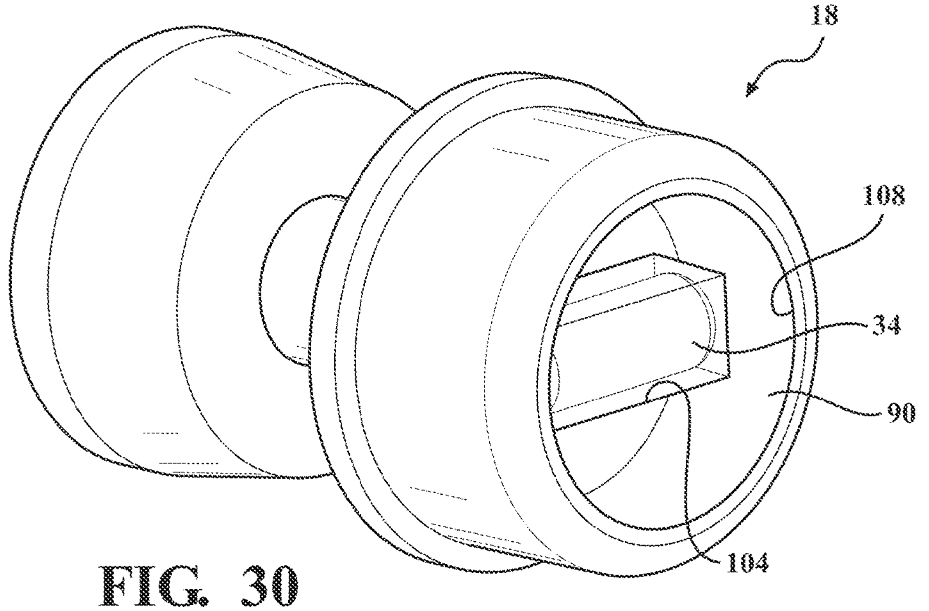
FIG. 30 is a perspective view of a thumb stud of the knife assembly incorporating tritium.
Figure 31:
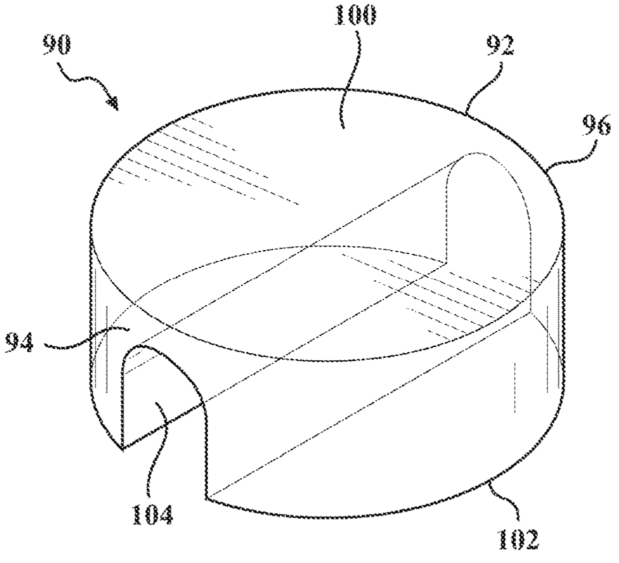
FIG. 31 is front perspective view of a third embodiment of the housing having a disc shape for incorporating the tritium into the thumb stud of the knife assembly.
Figure 33:
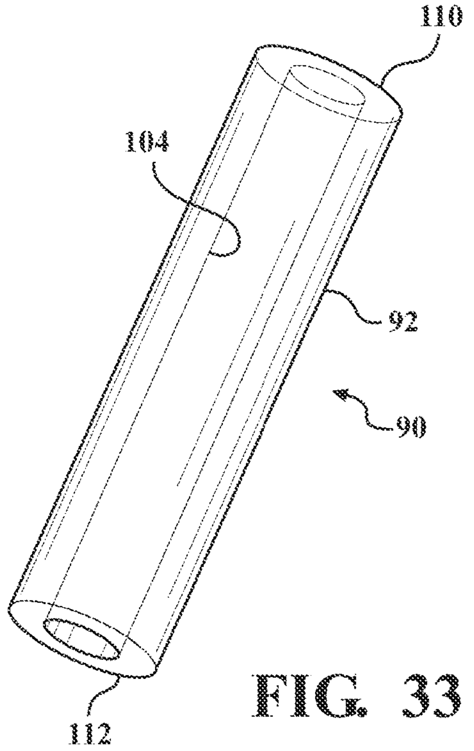
FIG. 33 is a perspective view of a fourth embodiment of the housing being cylindrical shaped and defining a hollow extending between a first and second open cylindrical end.

In accordance with another aspect, the subject disclosure is also directed to additionally incorporating tritium into the thumb stud 18 of the knife assembly 10. More specifically, and as illustrated in FIGS. 31-33, in accordance with this thumb stud tritium arrangement, the body 92 of the housing 90 described previously is generally disc or cylindrical (hockey puck) shaped, with the hollow 104 extending from the housing bottom 102 as well as between the first and second housing ends 94, 96. As illustrated in FIG. 30, in this arrangement, the housing 90 can be incorporated into a thumb stud cavity 108 defined by the thumb stud 18 of the knife assembly 10. Once incorporated into the thumb stud cavity 108, the housing 90 is recessed from or flush with an exterior surface of the thumb stud 18 to provide further protection to the tritium vial 34. The tritium vial 34 is also arranged longitudinally within the thumb stud 18 to increase visibility of the tritium vial 34, and allow the illumination provided by the tritium vial to be viewable by the user from a wider range of angles.

Figure 34:
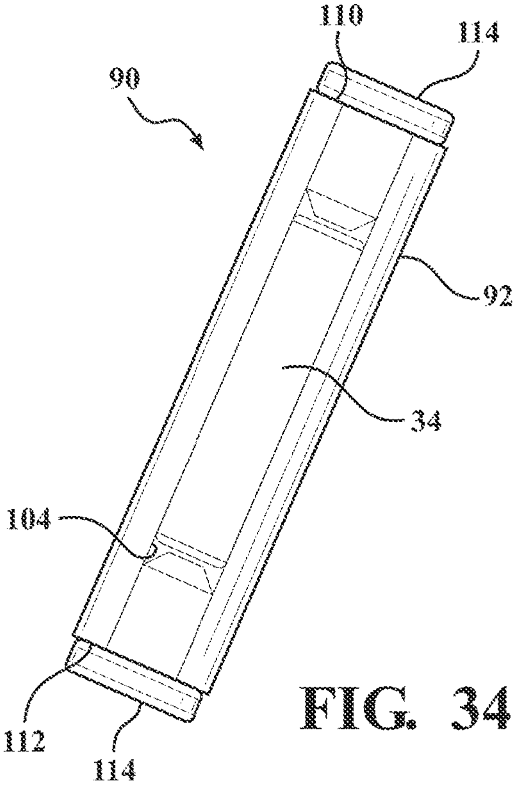
FIG. 34 is a perspective view of the fourth embodiment of the housing illustrating a pair of stoppers secured in the open cylindrical ends to trap and protect a tritium vial in a center of the housing.
Figure 35:
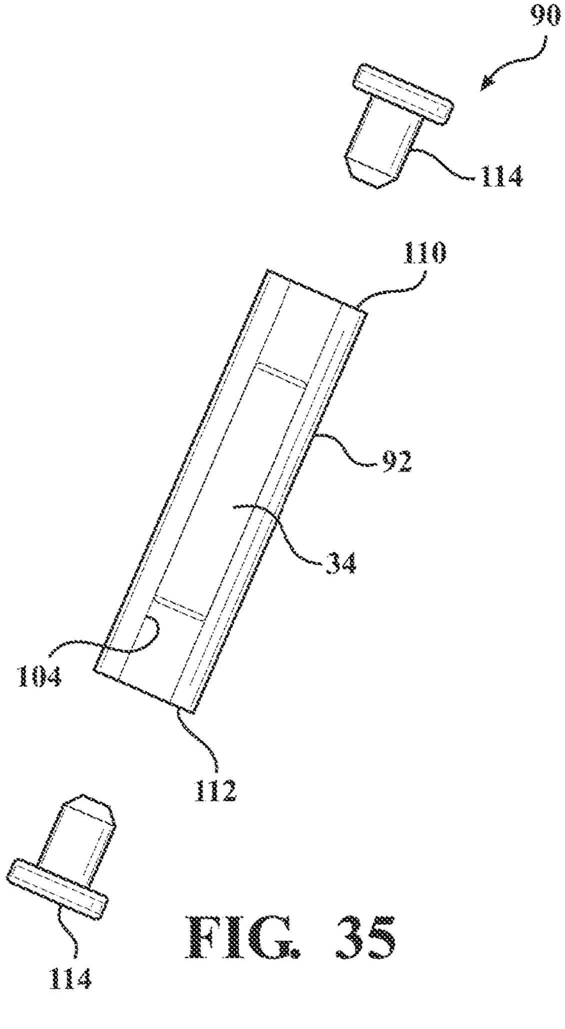
FIG. 35 is an exploded view of the housing of FIG. 34.

In accordance with another aspect, the subject disclosure is also directed to incorporating tritium into a glass breaker or a carabiner, which could be attached to the knife assembly 10 such as via a lanyard passing through the handle lanyard holes 76. More specifically, and as illustrated in FIGS. 33-35, the housing 90 for encapsulating tritium in this arrangement is cylindrical shaped and the body 92 defines the hollow 104 extending between a first open cylindrical end 110 and a second open cylindrical end 112. The tritium vial 34 is centrally located in the hollow 104 and a pair of rubber stopper plugs 114 are each inserted into a respective open cylindrical end 110, 112 to trap and protect the tritium vial 34 in the center of the housing 90.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A knife assembly comprising:

a handle having a first handle portion and a second handle portion extending in spaced and parallel relationship with one another from a first knife end to a second knife end to define a working gap;

a knife blade pivotably secured to one of said knife ends and pivotable from an engaged position wherein said knife blade extends from said respective knife end to a closed position wherein said knife blade is at least partially disposed between said first and second handle portions;

a spacer disposed within said working gap and extending longitudinally between said first and second handle portions from a first longitudinal spacer end disposed adjacent said first knife end to a second longitudinal spacer end to define a pair of opposing spacer sides each disposed in butting relationship with a respective one of said first and second handle portions for spacing said first and second handle portions from one another;

said spacer defining at least one cavity and at least one tritium vial housed within said at least one cavity of said spacer for allowing illumination produced by said at least tritium vial to be viewable by a user of the knife assembly;

each of said first and second handle portions defining a respective handle lanyard hole disposed adjacent said first knife end;

said spacer defining a spacer lanyard hole disposed adjacent said first longitudinal spacer end and extending between said opposing spacer sides; and said handle lanyard holes and said spacer lanyard hole disposed in aligned relationship with one another for allowing a lanyard to pass through said aligned handle lanyard holes and said spacer lanyard hole and be connected to the knife assembly.

2. The knife assembly as set forth in claim 1, wherein said at least one cavity is disposed between said first and second longitudinal spacer ends for allowing the tritium illumination to be viewable along a top portion of the knife assembly.

3. The knife assembly as set forth in claim 1, wherein said at least one cavity is disposed at said first longitudinal spacer end for allowing the tritium illumination to be viewable at said first end of the knife assembly.

4. The knife assembly as set forth in claim 1, wherein said at least one cavity includes a first cavity disposed at said first longitudinal spacer end and a second cavity disposed between said first and second longitudinal spacer ends, and said at least one tritium vial includes a first tritium vial disposed in said first cavity and a second tritium vial disposed in said second cavity for allowing tritium illumination to be viewable along both a top portion and said first end of the knife assembly.

5. The knife assembly as set forth in claim 1, wherein said spacer defines at least one through-hole and a fastener extends through said at least one through-hole and secures said first handle portion and said second handle portion to one another.

6. The knife assembly as set forth in claim 1, further comprising a housing disposed in said at least one cavity and defining a hollow for receiving and encapsulating said at least one tritium vial within said at least one cavity.

7. The knife assembly as set forth in claim 1, wherein at least one of said first or second handle portions defining a handle opening and an additional tritium vial disposed in said handle opening for allowing additional tritium illumination to be viewable from both sides of the knife assembly.

8. The knife assembly as set forth in claim 7, further comprising a housing disposed in said handle opening and defining a hollow for receiving and encapsulating said at least one tritium vial within said handle opening.

9. The knife assembly as set forth in claim 1, wherein said at least one spacer is comprised of a transparent or translucent material for allowing illumination produced by said at least one tritium vial to be viewable through said at least one spacer.

10. A knife assembly comprising:

a handle having a first handle portion and a second handle portion extending in spaced and parallel relationship with one another from a first knife end to a second knife end to define a working gap;

a knife blade pivotably secured to one of said knife ends and pivotable from an engaged position wherein said knife blade extends from said respective knife end to a closed position wherein said knife blade is at least partially disposed between said first and second handle portions;

a spacer disposed within said working gap and extending longitudinally between said first and second handle portions from a first longitudinal spacer end disposed adjacent said first knife end to a second longitudinal spacer end to define a pair of opposing spacer sides each disposed in butting relationship with a respective one of said first and second handle portions for spacing said first and second handle portions from one another;

said spacer defining at least one cavity and at least one tritium vial housed within said at least one cavity of said spacer for allowing illumination produced by said at least tritium vial to be viewable by a user of the knife assembly;

each of said first and second handle portions defining a respective handle lanyard hole disposed adjacent said first knife end; and said spacer including a pair of plug portions extending outwardly from a respective one of said opposing spacer sides and disposed within and plugging a respective one of said handle lanyard holes.

11. The knife assembly as set forth in claim 10, wherein each of said plug portions defining a plug cavity and said at least one tritium vial including a tritium vial disposed in each of said plug cavities for allowing tritium illumination to be viewable through said handle lanyard holes and on both sides of the knife assembly.

12. The knife assembly as set forth in claim 11, wherein said at least one cavity includes an additional cavity disposed between said first and second longitudinal spacer ends, and said at least one tritium vial includes an additional tritium vial disposed in said additional cavity for allowing the tritium illumination to be viewable along a top portion of the knife assembly as well as on both sides of the knife assembly.

13. The knife assembly as set forth in claim 11, wherein said at least one cavity includes an additional cavity disposed at said first longitudinal spacer end, and said at least one tritium vial includes an additional tritium vial disposed in said additional cavity for allowing the tritium illumination to be viewable at said first end as well as on both sides of the knife assembly.

14. The knife assembly as set forth in claim 11, wherein said spacer defines at least one through-hole and a fastener extends through said at least one through-hole and secures said first handle portion and said second handle portion to one another.

15. The knife assembly as set forth in claim 10, further comprising a housing disposed in said at least one cavity and defining a hollow for receiving and encapsulating said at least one tritium vial within said at least one cavity.

16. The knife assembly as set forth in claim 10, wherein at least one of said first or second handle portions defining a handle opening and an additional tritium vial disposed in said handle opening for allowing additional tritium illumination to be viewable from both sides of the knife assembly.

17. The knife assembly as set forth in claim 16, further comprising a housing disposed in said handle opening and defining a hollow for receiving and encapsulating said at least one tritium vial within said handle opening.

18. The knife assembly as set forth in claim 10, wherein said at least one spacer is comprised of a transparent or translucent material for allowing illumination produced by said at least one tritium vial to be viewable through said at least one spacer.

19. A knife assembly comprising:

a handle having a first handle portion and a second handle portion extending in spaced and parallel relationship with one another from a first knife end to a second knife end to define a working gap;

a knife blade pivotably secured to one of said knife ends and pivotable from an engaged position wherein said knife blade extends from said respective knife end to a closed position wherein said knife blade is at least partially disposed between said first and second handle portions;

each of said first and second handle portions defining a respective handle lanyard hole disposed adjacent said first knife end;

a spacer extending from a first spacer end disposed in abutting relationship with said first handle portion and a second spacer end disposed in abutting relationship with said second handle portion for spacing said first and second handle portions from one another;

said spacer including a pair of plug portions extending outwardly from a respective one of said first or second spacer ends and disposed within and plugging a respective one of said handle lanyard holes;

each of said plug portions defining a plug cavity; and a pair of tritium vials each disposed within a respective one of said plug cavities for allowing tritium illumination to be viewable through said handle lanyard holes and on both sides of the knife assembly.

20. The knife assembly as set forth in claim 19, further comprising a pair of housings each disposed in a respective one of said plug cavities and each defining a hollow for receiving and encapsulating a respective one of said pair of tritium vials.

* * * * *